US012300185B2

(12) United States Patent
Lin et al.

(10) Patent No.: US 12,300,185 B2
(45) Date of Patent: May 13, 2025

(54) LIQUID CRYSTAL DISPLAY DRIVING METHOD, ELECTRONIC DEVICE, AND DRIVER CHIP

(71) Applicant: TENCENT TECHNOLOGY (SHENZHEN) COMPANY LIMITED, Shenzhen (CN)

(72) Inventors: Ming-tien Lin, Shenzhen (CN); Weibiao Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/300,321

(22) Filed: Apr. 13, 2023

(65) Prior Publication Data

US 2023/0252949 A1 Aug. 10, 2023

Related U.S. Application Data

(63) Continuation of application No. PCT/CN2022/098827, filed on Jun. 15, 2022.

(30) Foreign Application Priority Data

Jun. 29, 2021 (CN) ......................... 202110726304.6

(51) Int. Cl.
*G09G 3/34* (2006.01)
*G09G 3/36* (2006.01)

(52) U.S. Cl.
CPC ........... *G09G 3/342* (2013.01); *G09G 3/3406* (2013.01); *G09G 3/36* (2013.01); (Continued)

(58) Field of Classification Search
None
See application file for complete search history.

(56) References Cited

U.S. PATENT DOCUMENTS

2006/0007110 A1 1/2006 Hung et al.
2007/0046844 A1* 3/2007 Murade ................ G09G 3/3677 349/5

(Continued)

FOREIGN PATENT DOCUMENTS

CN 107622760 A 1/2018
CN 109616074 A 4/2019

(Continued)

OTHER PUBLICATIONS

China National Intellectual Property Administration (CNIPA) Office Action 1 for 202110726304.6, Jan. 26, 2022 13 Pages (including translation).

(Continued)

*Primary Examiner* — Dorothy Harris
(74) *Attorney, Agent, or Firm* — Anova Law Group, PLLC

(57) ABSTRACT

A liquid crystal display (LCD) driving method includes: determining drive voltages of pixel units in a plurality of screen regions of an LCD based on an image frame to be displayed; outputting, for one of the plurality of screen regions, a first drive signal to a pixel unit in the screen region based on the determined drive voltage corresponding to the pixel unit, the first drive signal being used for controlling a liquid crystal molecule corresponding to the pixel unit in the screen region to rotate at the drive voltage; and outputting a second drive signal to a backlight source of the LCD when the first drive signal is output to the pixel unit in the screen region and a target duration is reached, the second drive signal being used for controlling a part of the backlight source corresponding to the screen region to be turned on.

14 Claims, 12 Drawing Sheets

(52) U.S. Cl.
CPC ................ *G09G 2310/024* (2013.01); *G09G 2320/0646* (2013.01); *G09G 2340/0407* (2013.01)

(56) References Cited

U.S. PATENT DOCUMENTS

| | | | | |
|---|---|---|---|---|
| 2009/0167670 | A1* | 7/2009 | Peng | G09G 3/3426 345/102 |
| 2010/0091096 | A1* | 4/2010 | Oikawa | G06T 7/73 348/E13.001 |
| 2010/0302133 | A1* | 12/2010 | Liang | G09G 3/3426 345/102 |
| 2011/0204800 | A1* | 8/2011 | Lin | H05B 45/46 315/185 R |
| 2011/0254827 | A1* | 10/2011 | Tamura | G09G 3/3648 345/212 |
| 2011/0285611 | A1* | 11/2011 | Asano | G09G 3/3426 345/87 |
| 2015/0070343 | A1* | 3/2015 | Lee | G09G 3/20 345/212 |
| 2017/0309234 | A1 | 10/2017 | Richards | |
| 2018/0211580 | A1 | 7/2018 | Su et al. | |
| 2018/0261179 | A1* | 9/2018 | Chen | G09G 3/3677 |
| 2020/0035170 | A1* | 1/2020 | Shi | G09G 3/3426 |
| 2020/0271280 | A1* | 8/2020 | Liu | G02F 1/133617 |
| 2021/0116753 | A1* | 4/2021 | Ahmed | G02F 1/133603 |

FOREIGN PATENT DOCUMENTS

| | | | |
|---|---|---|---|
| CN | 109656043 | A | 4/2019 |
| CN | 112700751 | A | 4/2021 |
| CN | 113470588 | A | 10/2021 |

OTHER PUBLICATIONS

China National Intellectual Property Administration (CNIPA) Office Action 1 for 202110726304..6 Jun. 29, 2022 12 Pages (including translation).

The World Intellectual Property Organization (WIPO) International Search Report for PCT/CN2022/098827 Aug. 3, 2022 14 Pages (including translation).

The European Patent Office (EPO) The Extended European Search Report for 22831700.4 Sep. 7, 2024 11 Pages.

* cited by examiner

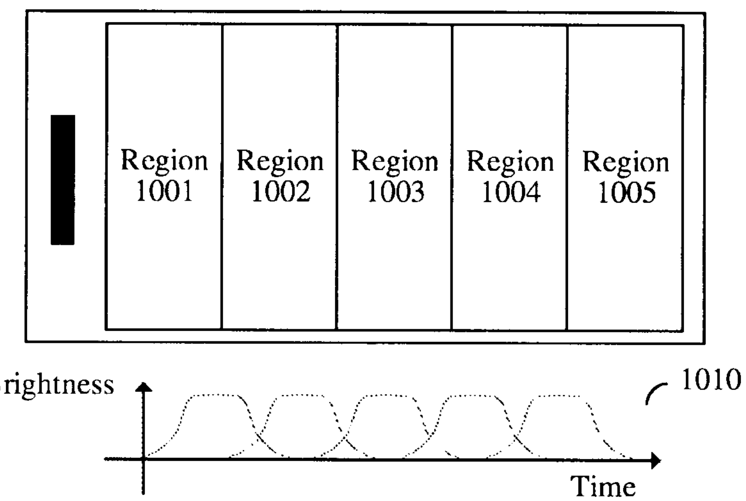
FIG. 10
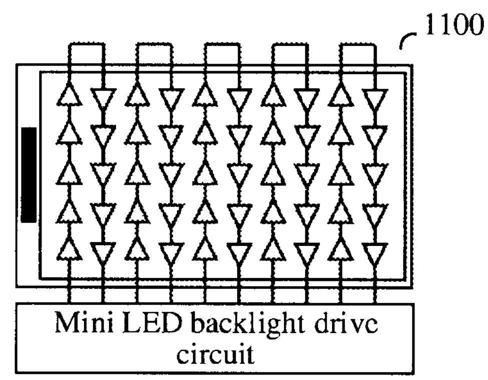
FIG. 11
| | | | | |
|---|---|---|---|---|
| 1201 | 1206 | 1211 | 1216 | 1221 |
| 1202 | 1207 | 1212 | 1217 | 1222 |
| 1203 | 1208 | 1213 | 1218 | 1223 |
| 1204 | 1209 | 1214 | 1219 | 1224 |
| 1205 | 1210 | 1215 | 1220 | 1225 |
FIG. 12

1800 mini LED

LIQUID CRYSTAL DISPLAY DRIVING METHOD, ELECTRONIC DEVICE, AND DRIVER CHIP

CROSS-REFERENCES TO RELATED APPLICATIONS

This application is a continuation application of PCT Patent Application No. PCT/CN2022/098827, entitled "DRIVING METHOD FOR LIQUID CRYSTAL DISPLAY, ELECTRONIC DEVICE, AND DRIVER CHIP" and filed on Jun. 15, 2022, which claims priority to Chinese Patent Application No. 202110726304.6, entitled "LIQUID CRYSTAL DISPLAY DRIVING METHOD, ELECTRONIC DEVICE, AND DRIVER CHIP", and filed with the China National Intellectual Property Administration on Jun. 29, 2021, the entire contents of both of which are incorporated herein by reference.

FIELD OF THE TECHNOLOGY

The present disclosure relates to the technical field of liquid crystal display, and in particular, to a liquid crystal display (LCD) driving method, and a display apparatus having an LCD, an electronic device, a driver chip, and a storage medium.

BACKGROUND OF THE DISCLOSURE

With the development of virtual reality (VR) technologies, many VR devices, such as a VR helmet and VR glasses, have appeared. In a VR helmet or VR glasses, a VR image is generally displayed through a thin film transistor liquid crystal display (TFT LCD).

A display module of the TFT LCD includes: a light guide plate, a lower polarizer, a thin film transistor, a liquid crystal layer, a color filter plate, and an upper polarizer. The TFT LCD realizes backlighting through the light guide plate. After the backlight source is turned on, the light will be transmitted through the light guide plate and diffused into the display region of the display screen. Therefore, the entire display screen is either completely lit or completely off. To avoid VR image display errors, it is necessary to turn on the backlight source after data in the entire display region is completely written and the liquid crystal layer is completely rotated.

In the foregoing process, because the writing speed of the indium tin oxides (ITO) capacitive switch signal of the liquid crystal layer in the TFT LCD is limited by the ITO line width, that is, the refresh rate of the TFT LCD is limited. In this case, to reserve sufficient rotation time for liquid crystal molecules in the liquid crystal layer, the duration for writing data will be inevitably caused to be shortened. The resolution of the TFT LCD has a relatively great limitation, so that there is an urgent need for a method that can improve the resolution without decreasing the refresh rate.

SUMMARY

The embodiments of the present disclosure provide an LCD driving method, a display apparatus having an LCD, an electronic device, a driver chip, and a storage medium, which can improve the LCD resolution without decreasing the LCD refresh rate. The technical solutions are as follows:

According to an aspect, an LCD driving method is provided, performed by a controller of an LCD, the method including: determining drive voltages of pixel units in a plurality of screen regions of the LCD based on an image frame to be displayed; outputting, for one of the plurality of screen regions, a first drive signal to a pixel unit in the screen region based on the determined drive voltage corresponding to the pixel unit, the first drive signal being used for controlling a liquid crystal molecule corresponding to the pixel unit in the screen region to rotate at the drive voltage; and outputting a second drive signal to a backlight source of the LCD when the first drive signal is output to the pixel unit in the screen region and a target duration is reached, the second drive signal being used for controlling a part of the backlight source corresponding to the screen region to be turned on.

According to an aspect, a display apparatus having an LCD is provided. The LCD includes: a display module, a mini light emitting diode (Mini LED) backlight module, and a driver chip. The display module includes liquid crystal molecules, and the Mini LED backlight module includes red green blue (RGB) Mini LEDs, the RGB Mini LEDs being configured to provide a backlight source to the display module. The driver chip is configured to: determine drive voltages of pixel units in a plurality of screen regions of the LCD based on an image frame to be displayed; output, for one of the plurality of screen regions, a first drive signal to a pixel unit in the screen region based on the determined drive voltage corresponding to the pixel unit, the first drive signal being used for controlling a liquid crystal molecule corresponding to the pixel unit in the screen region to rotate at the drive voltage; and output a second drive signal to the Mini LED backlight module when the first drive signal is output to the pixel unit in the screen region and a target duration is reached, the second drive signal being used for controlling a part of the backlight source corresponding to the screen region to be turned on.

According to an aspect, an electronic device is provided. The electronic device includes an LCD, one or more controllers and one or more memories of the LCD, the one or more memories storing at least one computer program, the at least one computer program being loaded and executed by the one or more controllers to implement the LCD driving method described above.

According to an aspect, a driver chip of an LCD is provided. The driver chip includes one or more controllers and one or more memories, the one or more memories storing at least one computer program, the at least one computer program being loaded and executed by the one or more controllers to implement the LCD driving method described above.

According to an aspect, a non-transitory computer-readable storage medium is provided, storing at least one computer program, the at least one computer program being loaded and executed by a processor to implement the LCD driving method described above.

The technical solutions provided in the embodiments of the present disclosure achieve at least the following beneficial effects:

By dividing an LCD into a plurality of screen regions, outputting a first drive signal to each pixel unit in each screen region, and after completion of controlling liquid crystal molecules in the current screen region to rotate, directly outputting a second drive signal to a backlight source without waiting for completion of rotation of all liquid crystal molecules in other screen regions, to control some of light sources corresponding to the current screen region to be turned on, a waiting duration of each screen region in the LCD during the backlighting process is reduced, and the reduced waiting duration can be used for a controller of the LCD to receive a larger amount of data writing, thereby greatly improving the LCD resolution without decreasing the LCD refresh rate.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art can still derive other drawings from these accompanying drawings without creative efforts.

FIG. 10 is a schematic principle diagram of a partition manner of an LCD according to an embodiment of the present disclosure.

FIG. 11 is a schematic logical diagram of a backlight circuit according to an embodiment of the present disclosure.

FIG. 12 is a schematic principle diagram of a partition manner of an LCD according to an embodiment of the present disclosure.

DESCRIPTION OF EMBODIMENTS

Figure 1:
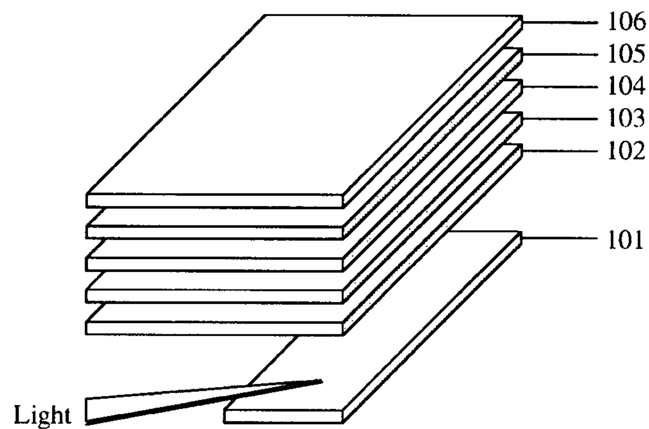
FIG. 1 is a schematic diagram of a display module of a side incident type TFT LCD according to an embodiment of the present disclosure.

To make the objectives, technical solutions, and advantages of the present disclosure clearer, the following further describes implementations of the present disclosure in detail with reference to the accompanying drawings.

The terms "first", "second", and the like in the present disclosure are used for distinguishing between same items or similar items of which effects and functions are basically the same. The "first", "second", and "$n^{th}$" do not have a dependency relationship in logic or time sequence, and a quantity and an execution order thereof are not limited.

The term "at least one" in the present disclosure means one or more and "a plurality of" means two or more. For example, a plurality of first positions means two or more first positions.

Terms involved in the embodiments of the present disclosure are explained below:

Liquid crystal display (LCD): It is also referred to as a liquid crystal display, and is a type of flat-panel display. LCDs are configured for screen display of electronic devices such as a television, a computer, and a digital clock, and have the advantages of low power consumption, small size, and low radiation. The LCD uses a liquid crystal solution in two polarized materials. When a current passes through the liquid crystal solution, liquid crystal molecules will be rearranged to achieve the purpose of imaging. The liquid crystal molecules will present different optical characteristics under the action of different voltages. Driving manners of the LCD may be divided into three types: static driving, simple matrix (which is also referred to as passive matrix) driving, and active matrix (which is also referred to as active matrix) driving.

Thin film transistor liquid crystal display (TFT LCD): TFT LCD is a type of active matrix liquid crystal display (AM-LCD), where TFT is the abbreviation of thin film transistor. Because LCDs require voltage control to generate gray scales, and an LCD that use a TFT to generate a voltage to control a rotation angle of a liquid crystal molecule is referred to as a TFT LCD, that is, each pixel unit (that is, liquid crystal pixel point) on the TFT LCD is driven by a TFT integrated behind the pixel point. The TFT LCD has the advantages such as high responsiveness, high brightness, and high contrast ratio. A display module of the TFT LCD includes: a light guide plate, a lower polarizer, a TFT, a liquid crystal layer, a color filter plate, and an upper polarizer. The rotation angle of the liquid crystal molecule is controlled by changing the signal and voltage applied to the TFT, so as to control the emitting of polarized light of each pixel point to achieve the purpose of display.

Active matrix organic light emitting diode (AMOLED): It is also referred to as active matrix organic light emitting diode. AMOLED is a display screen technology, where organic light emitting diode (OLED) describes the type of the thin film display technology as organic electroluminescent display, and AM describes the driving manner of the LCD.

Micro light emitting diode (Micro LED): The Micro LED display technology refers to a display technology in which self-luminous micron-level LEDs are used as light-emitting pixel units and the light-emitting pixel units are assembled on a drive panel to form a high-density LED array. Due to the characteristics such as small chip size, high integration, and self-illumination, the Micro LED has great advantages in aspects such as brightness, resolution, contrast ratio, energy consumption, service life, response speed, and thermal stability compared with the LCD and the OLED in terms of display.

Virtual reality (VR) technology: It is also referred to as telepathic technology, and is a new practical technology developed in the 20th century. The VR, as the name implies, is the combination of virtuality and reality. The VR technology includes computers, electronic information, and the simulation technology. Theoretically, the VR technology is a computer simulation system through which a virtual world can be created and experienced. In the VR technology, a computer is used to generate a simulated environment, to enable a user to be immersed into the environment. The VR technology is to combine, through the electronic signal generated by using the computer technology, the data in real life with various output devices to transform the data into phenomena that people can feel. These phenomena may be real objects in reality, or may be substances that cannot be seen with naked eyes and are shown through a three-dimensional model. Because these phenomena cannot be seen directly, but are a world in reality simulated by using the computer technology, these phenomena are also referred to as VR.

Screen door effect: The screen door effect is the phenomenon of thin line dancing and separation flickering of high-contrast ratio edges caused by real-time rendering in the case of insufficient pixels. In the field of VR, the screen door effect refers to the phenomenon that due to the insufficient resolution of the VR device (screen and content), the human eyes will directly see the pixel points of the display screen, as if looking at things through a screen window.

With the continuous development of social productivity and science and technology, the demand for the VR technology in all walks of life is increasing. The VR technology has also made great progress and has gradually become a new field of science and technology. The VR technology has been recognized by an increasing number of people. Users can experience the most authentic feelings in the VR world. It is difficult to distinguish the simulated environment from the real world, and the authenticity of the simulated environment makes people feel like being on the scene; in addition, VR has all the perception functions that human beings have, for example, perception systems such as hearing, vision, touch, taste, and smell; finally, VR has an ultra-strong simulation system, which truly realizes man-machine interaction, so that people can perform operations freely and get the most realistic feedback from the environment in the operation process. Due to the characteristics such as existence, multi-perception, and interactivity, the VR technology is appreciated by many people.

The realization of the VR technology depends on VR devices. The VR devices refer to hardware devices that support the VR technology, including a VR helmet and VR glasses. After years of development and in-depth research, to continuously improve the experience of using a VR device, how to improve the overall machine to a greater extent in terms of ergonomics, display effect, and richness of interaction has always been a part that the VR industry continues to pay attention and work hard. In terms of improving the display effect, technicians have been trying hard to improve the display effect indicators such as resolution, refresh rate, and brightness range to achieve a better display experience. However, limited by the current screen production process, under a common display architecture, indicators such as the resolution and the refresh rate are already close to a critical value in an equilibrium state.

Currently, VR devices commonly use: display solutions such as TFT LCD, AMOLED, and Micro LED. Because the Micro LED is based on the semiconductor production process, it has a very obvious advantage in resolution, but because of its high price, its application has been difficult to popularize. With the popularization of application of AMOLED displays on mobile phones, production convenience and manufacturing costs of the AMOLED displays have been greatly reduced, but because it is difficult for the AMOLED displays to realize pixel point arrangement in real red green blue (RGB) arrangement, the degree of delicacy of display thereof is not high, and there is a relatively obvious screen door effect. The TFT LCD has gradually become the mainstream display solution for VR devices because its cost advantage is relatively large, the process is mature, and the pixel point arrangement is real RGB arrangement. However, limited by the architecture and the driving manner of the TFT LCD, the TFT LCD cannot achieve relatively high parameter specifications in all of the resolution, refresh rate, and brightness range, and it is difficult to achieve hardware specifications with relatively high display quality and balanced parameters.

A detailed analysis of the display solution of the TFT LCD will be provided below:

A display module of the TFT LCD includes: a light guide plate, a lower polarizer, a thin film transistor, a liquid crystal layer, a color filter plate, and an upper polarizer. The TFT LCD realizes backlighting through the light guide plate. After the backlight source is turned on, the light will be transmitted through the light guide plate and diffused into the display region of the display screen. Therefore, the entire display screen is either completely lit or completely off. To avoid VR image display errors, it is necessary to turn on the backlight source after data in the entire display region is completely written and the liquid crystal layer is completely rotated. Backlighting manners of the light guide plate may be divided into direct-type and side incident type. The direct-type means that the backlight source is placed on the back of the light guide plate, and the side incident type means that the backlight source is placed on the side of the light guide plate.

FIG. 1 is a schematic diagram of a display module of a side incident type TFT LCD according to an embodiment of the present disclosure. As shown in FIG. 1, the display module includes: a light guide plate 101, a lower polarizer 102, a TFT 103, a liquid crystal layer 104, a color filter plate 105, and an upper polarizer 106. When a backlight source LED in the side direction is turned on, the light will be transmitted, that is, diffused into the display region of the LCD through the light guide plate 101. Because the backlight source LED can only realize the design of a unified switch, either it is always turned on and the entire LCD is completely lit, or it is always turned off and the entire LCD is completely off.

Because the writing speed of the indium tin oxides (ITO) capacitive switch signal of the liquid crystal layer 104 in the TFT LCD is limited by the ITO line width, that is, the refresh rate of the TFT LCD is limited. In this case, to reserve sufficient rotation time for liquid crystal molecules in the liquid crystal layer 104, the duration for writing data will be inevitably caused to be shortened. The resolution of the TFT LCD has a relatively great limitation, and it is impossible to achieve joint improvement of the two specifications including the refresh rate and the resolution.

Figure 2:
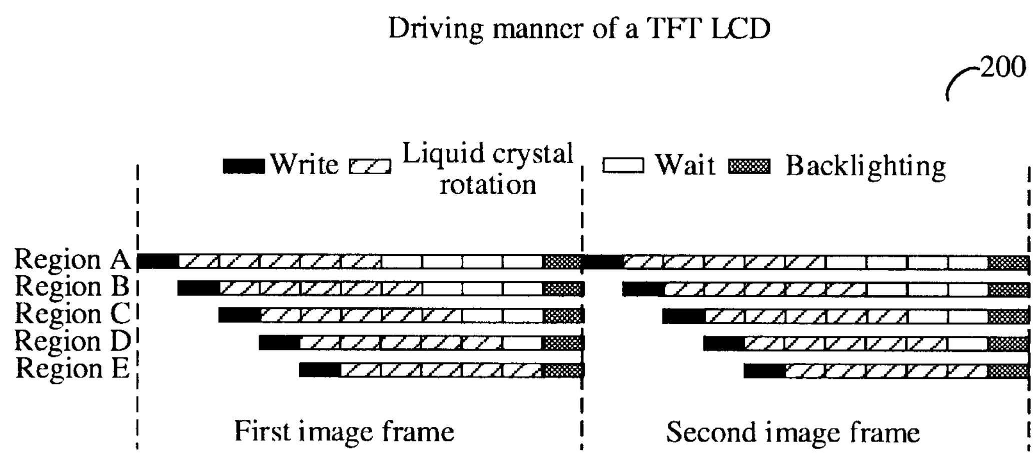
FIG. 2 is a principle diagram of a driving manner of a TFT LCD according to an embodiment of the present disclosure.

FIG. 2 is a principle diagram of a driving manner of a TFT LCD according to an embodiment of the present disclosure. As shown in 200 in FIG. 2, the TFT LCD is divided into five screen regions A to E. For the first image frame, a graphics processing unit (GPU) sequentially writes the respective image data of the screen region A to E (that is, the pixel value of each pixel point) to a controller of the TFT LCD. For each screen region, once the writing is completed, a corresponding first drive signal is applied to a pixel unit in the screen region, to control a liquid crystal molecule corresponding to the pixel unit to rotate. Because the backlight source of the TFT LCD can only be completely turned on or completely turned off, after the liquid crystal molecules in the screen region A are rotated, it is necessary to enter the waiting stage. That is, only after all liquid crystal molecules in the other screen regions B, C, D, and E are rotated, the backlight source can be turned on, that is, the first image frame is displayed on the TFT LCD. After a certain continuous lighting time, the backlight source is turned off, and the GPU sequentially writes image data of the second image frame in the screen regions A to E to the controller of the TFT LCD, and performs a similar display driving process.

In view of this, the embodiments of the present disclosure provide an LCD driving method, which can improve the resolution without decreasing the refresh rate. Based on the structural framework of the TFT LCD, the backlight source of the TFT LCD is replaced with a Mini LED, and the driving manner of the TFT LCD is adjusted, thereby achieving higher resolution and a larger brightness range. For VR usage scenarios, by making full use of the characteristics of being capable of being switched locally of the Mini LED, backlight partition processing can be implemented in the entire LCD. For each screen region, the backlight is turned on in time after the signal writing is completed on the TFT layer and the liquid crystal is completely rotated, so that the LCD presents partial image content in the screen region, which can reduce the waiting time of each screen region before the backlight is turned on in a direct-type or side incident type driving manner. Further, the waiting time reduced in this technical solution can be used to write more image data, or increase the turning-on duration of the backlight source, thereby improving the resolution and the brightness range of the LCD.

Figure 3:
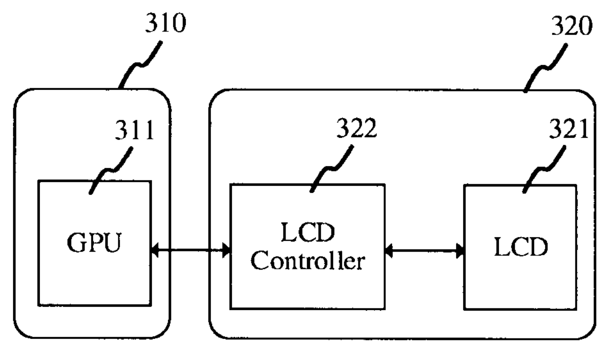
FIG. 3 is a schematic diagram of an implementation environment of an LCD driving method according to an embodiment of the present disclosure.

FIG. 3 is a schematic diagram of an implementation environment of an LCD driving method according to an embodiment of the present disclosure. Referring to FIG. 3, the implementation environment includes an image processing device 310 and an electronic device 320 having an LCD. The electronic device 320 may be a VR device supporting the VR technology, or a display device not supporting the VR technology. The type of the electronic device 320 is not specifically limited in the embodiments of the present disclosure. The image processing device 310 includes a GPU 311, and the electronic device 320 includes an LCD 321 and a controller 322 of the LCD.

The GPU 311 on the image processing device 310 is configured to acquire a video stream to be played, the video stream including consecutive image frames and audio frames, and an image frame and an audio frame at a same moment form a video frame at this moment. In an embodiment, a user selects a video to be played on the image processing device 310, and the image processing device 310 loads a video stream of the video to the GPU 311. In an embodiment, the video stream may be stored locally on the image processing device 310, or may be stored on a cloud server.

In an embodiment, the server may be an independent physical server, or a server cluster or a distributed system formed by a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The image processing device 310 and the server may be directly or indirectly connected in a wired or wireless communication manner. This is not limited in the present disclosure.

The controller 322 of the LCD on the electronic device 320 is configured to control data communication between the GPU 311 and the LCD 321. In the display process, the GPU 311 will write consecutive image frames to the controller 322, and when the controller 322 receives each image frame, the controller will drive the LCD 321 to display the image frame.

The LCD 321 on the electronic device 320 is a liquid crystal panel, which is controlled by the controller 322 to display corresponding image frames. In an embodiment, the LCD 321 may be divided into a plurality of screen regions, so as to display different parts of an image frame in units of screen regions. For example, the LCD 321 is divided into five equal-height screen regions according to the vertical position from top to bottom. After the image data of each screen region is written, a first drive signal is applied to control a liquid crystal molecule corresponding a pixel unit in the current screen region to rotate, and after the liquid crystal molecules in the current screen region are rotated, a second drive signal is applied to control some of light sources corresponding to the pixel units in the current screen region to be turned on, so that a corresponding image part in the image frame is displayed in the current screen region in the LCD 321.

In an embodiment, the electronic device 320 may be a VR device, a smartphone, a tablet computer, a notebook computer, a desktop computer, a smart speaker, a smartwatch, an in-vehicle terminal, an e-book reader, or the like, but is not limited thereto.

In some embodiments, the image processing device 310 and the electronic device 320 may be integrated on the same physical machine, or the image processing device 310 and the electronic device 320 may be combined into an LCD display system in a wired or wireless communication manner, to implement the driving manner of the LCD provided in the embodiments of the present disclosure. In this embodiment of the present disclosure, only an example in which the image processing device 310 and the electronic device 320 are integrated on the same physical machine is used for illustration.

A person skilled in the art may know that the LCD 321 included in the electronic device 320 may generally refer to one of a plurality of LCDs, and there may be more or fewer LCDs 321. For example, there may be only one LCD 321, and the controller 322 only drives the single LCD 321 to display an image frame; or there may be a plurality of, a dozen or dozens of, or more LCDs 321, and the controller 322 controls all the LCDs 321 to display the same or different content (such as cases of split screen display and multi-screen display). The quantity of LCDs 321 included in the electronic device 320 is not limited in the embodiments of the present disclosure.

Figure 4:
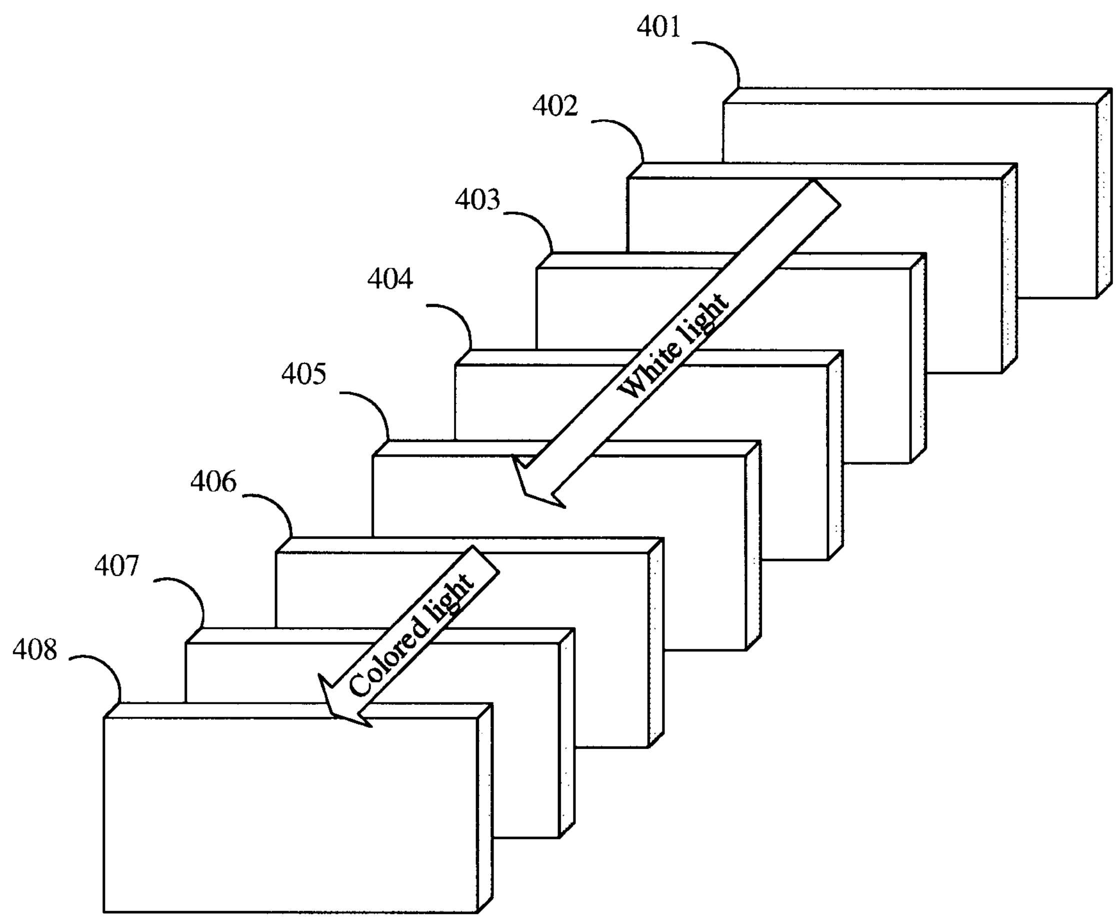
FIG. 4 is a schematic architectural diagram of a Mini LED backlight source-based TFT LCD according to an embodiment of the present disclosure.

The core idea of the embodiments of the present disclosure will be described below:

FIG. 4 is a schematic architectural diagram of a Mini LED backlight source-based TFT LCD according to an embodiment of the present disclosure. As shown in FIG. 4, a display module of a Mini LED backlight source-based TFT LCD includes: a backlight cover 401, a Mini LED backlight source 402, a lower polarizer 403, a TFT 404, a liquid crystal layer 405, an RGB color filter plate 406, an upper polarizer plate 407, and surface layer glass 408. It can be seen that the LCD panel provided in this embodiment of the present disclosure may not belong to any one of the direct-type or side-type, but uses a Mini LED to provide the backlight source. The Mini LED can divide the LCD into a plurality of screen regions, and may separately turn on some of light sources corresponding to a certain screen region, that is, can turn on the backlight source in partitions. In addition, the TFT LCD and the Mini LED can also realize the synchronization of drive signals, so as to ensure that the LCD panel and the Mini LED can be synchronously driven by the controller of the LCD.

By adjusting the backlight source of the TFT LCD to the Mini LED, the foregoing Mini LED backlight source-based TFT LCD can perform partition lighting on the plurality of screen regions obtained through division by using the Mini LED, and cooperate with the corresponding driving logic to realize improvement of parameter specifications of the refresh rate, resolution, and brightness range of each screen region in the electronic device (for example, a VR device). That is, high resolution and a high brightness range can be maintained while maintaining a high refresh rate, thereby greatly improving the experience of using the VR device.

Figure 5:
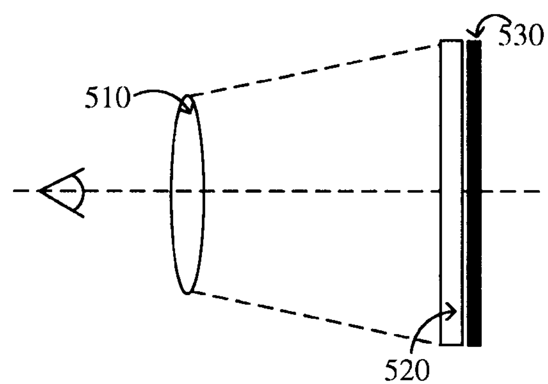
FIG. 5 is a schematic diagram of an application scenario of a driving manner of an LCD according to an embodiment of the present disclosure.

FIG. 5 is a schematic diagram of an application scenario of a driving manner of an LCD according to an embodiment of the present disclosure. As shown in FIG. 5, an example in which the electronic device is a VR device is used. When the VR device is used to display a VR image, an optical lens module 510, a TFT LCD display module 520, and a Mini LED backlight module 530 are required. The optical lens module 510 includes, but not limited to, a single lens or a plurality of lenses, a resin lens or glass lens, an aspheric lens, a Fresnel lens or compound lens, or the like. The type of the optical lens module 510 used in the VR device is not specifically limited in the embodiments of the present disclosure. The main display screen uses a TFT LCD display module 520, but abandons a direct-type or side-type backlight manner, and uses a Mini LED backlight module 530. By using the Mini LED backlight module 530, each screen region in the LCD can be individually lit to achieve the effect that different screen regions can be lit asynchronously, and with the display partition technology of the LCD, the liquid crystal molecules are rotated immediately after image data of each screen region has been written. After the rotation of the liquid crystal molecules, there is no need to wait for all the liquid crystal molecules in other screen regions to be rotated, and some of light sources of the current screen region in the backlight source may be first turned on, so that the LCD displays a part of an image frame in the current screen region, thereby allowing the user to see a partial image. This LCD driving manner minimizes the time spent in waiting for the liquid crystal molecules in other screen regions to rotate. Although during image display, the display is sequentially performed in different screen regions, in the case of a high refresh rate, the inherent visual persistence characteristic of the human eyes can ensure that the actual display effect of observation by the human eyes is not affected, and a better image display experience is provided.

Figure 6:
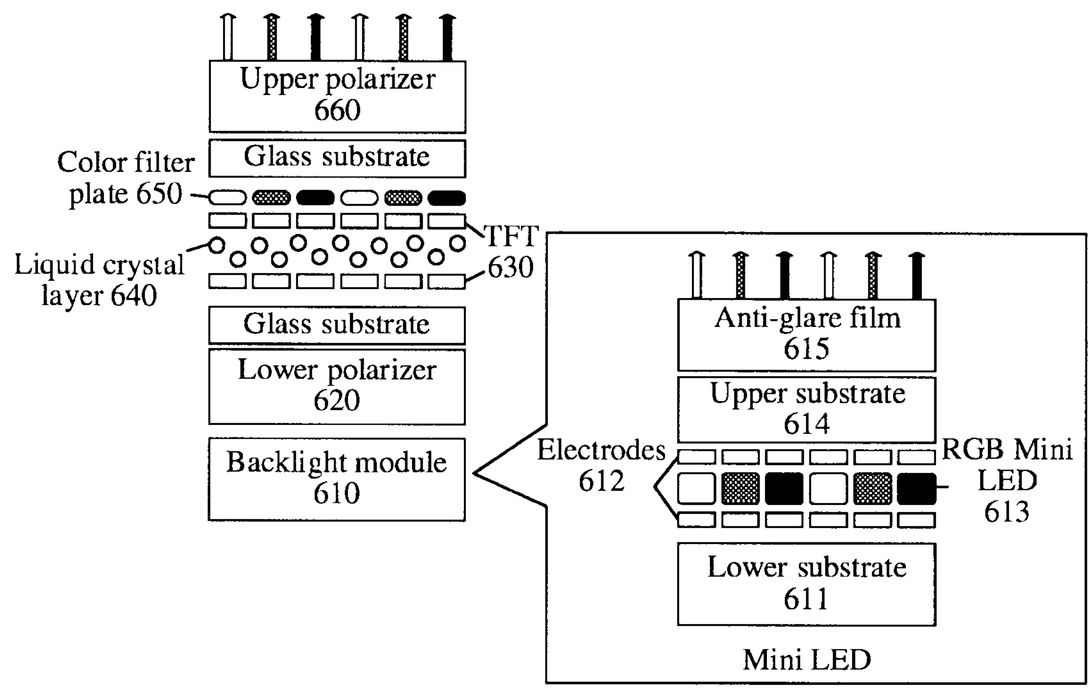
FIG. 6 is a schematic stacked structure diagram of a Mini LED backlight source-based TFT LCD according to an embodiment of the present disclosure.

FIG. 6 is a schematic stacked structure diagram of a Mini LED backlight source-based TFT LCD according to an embodiment of the present disclosure. As shown in FIG. 6, a Mini LED backlight source-based TFT LCD includes a Mini LED backlight module 610, a lower polarizer 620, a TFT 630, a liquid crystal layer 640, a color filter plate 650, and an upper polarizer 660. The Mini LED backlight module 610 includes a lower substrate 611, electrodes 612, an RGB Mini LEDs 613, an upper substrate 614, and an anti-glare film 615. The controller of the LCD can drive the TFT 630 through a first drive signal, to control the liquid crystal molecules in the liquid crystal layer 640 to rotate. The controller of the LCD can drive the RGB Mini LED 613 in the Mini LED backlight module 610 through a second drive signal, to turn on the backlight source of the RGB Mini LED 613.

Figure 7:
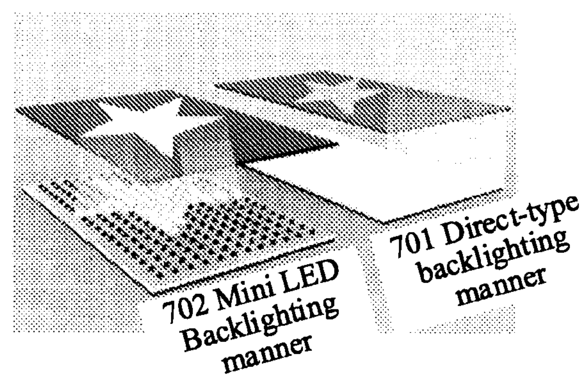
FIG. 7 is a schematic diagram of a comparison of backlighting manners according to an embodiment of the present disclosure.

FIG. 7 is a schematic diagram of a comparison of backlighting manners according to an embodiment of the present disclosure. As shown in FIG. 7, a part 701 shows an example backlighting manner, and a direct-type backlighting manner is used as an example. It can be seen that in the example backlighting manner, the backlight panel is either completely lit or completely off. A part 702 shows a Mini LED-based backlighting manner provided in this embodiment of the present disclosure. Because the Mini LED backlight source can control different partitions to respectively turn on some of light sources thereof, some of light sources corresponding to only the five-pointed star part in 702 may be turned on, while the remaining light sources may be maintained to be turned off, so as to save energy and maintain a respectively large contrast ratio between the lit part and the non-lit part.

Figure 8:
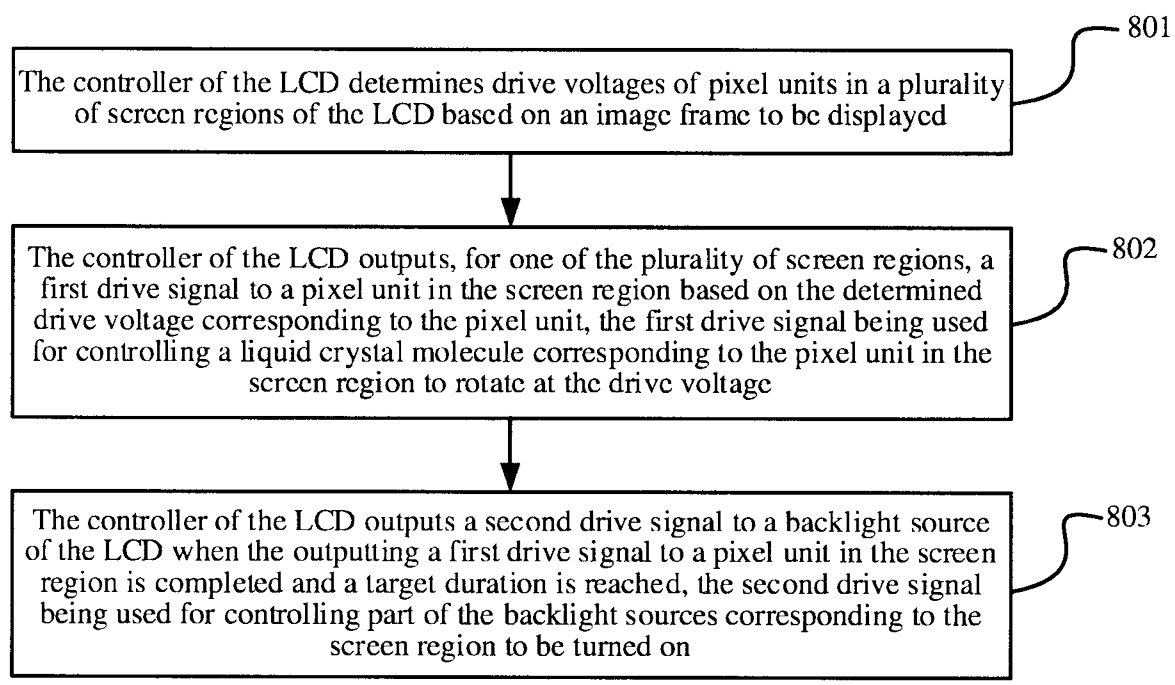
FIG. 8 is a flowchart of an LCD driving method according to an embodiment of the present disclosure.

FIG. 8 is a flowchart of an LCD driving method according to an embodiment of the present disclosure. Referring to FIG. 8, the embodiment is applied to an electronic device having an LCD, and is performed by a controller of the LCD. In an embodiment, the electronic device may also be referred to as user equipment, a display device, a user terminal, a terminal device, a terminal, or the like. The embodiment includes the following steps 801 to 803:

801: The controller of the LCD determines drive voltages of pixel units in a plurality of screen regions of the LCD based on an image frame to be displayed.

In some embodiments, the electronic device may be a display device that supports an LCD, such as a smartphone, a tablet computer, a notebook computer, a desktop computer, a smart speaker, a smartwatch, an e-book reader, or the like, but is not limited thereto.

In some embodiments, the electronic device may be a VR device, such as a VR helmet or VR glasses. The LCD is a display component of the VR device. In this case, the image frame to be displayed may be a VR image frame, where VR refers to a computer-generated three-dimensional virtual environment that can make the user be immersed and is isolated from the real environment.

In some embodiments, the electronic device may alternatively be a mixed reality (MR) device, such as an MR helmet or MR glasses. The LCD is a display component of the MR device. In this case, the image frame to be displayed may be an MR image frame. MR refers to mixing the real environment and the virtual environment through a hologram, and may also be regarded as a mixture of VR and augmented reality (AR).

In some embodiments, the controller of the LCD on the electronic device receives the image frame to be displayed sent by the GPU of the electronic device. The image frame may be any one of the consecutive image frames in the video stream, or may be a separate to-be-displayed image that does not belong to the video stream. In an embodiment, the video stream may be a regular video stream, a VR video stream, an MR video stream, or the like. Similarly, the corresponding image frames may be regular image frames, VR image frames, MR image frames, or the like. This is not specifically limited in the embodiments of the present disclosure.

In some embodiments, during determining of the drive voltages of pixel units in the plurality of screen regions according to the image frame to be displayed, because the image frame received by the controller of the LCD refers to pixel values of pixel points in the image frame, and each pixel point in the image frame corresponds to a pixel unit in a screen region of the LCD, the drive voltage of each pixel unit may be used to drive a liquid crystal molecule in the corresponding LCD liquid crystal layer to rotate, so that after the light passes through layers of the LCD, a color indicated by the pixel value of the corresponding pixel point can be presented.

In an embodiment, the LCD involved in this embodiment of the present disclosure may be an LCD that supports partitions for backlighting. Therefore, for any one of the plurality of screen regions divided on the LCD, during determining of the drive voltages of the pixel units in the screen region, the controller of the LCD may determine pixel values of pixel points corresponding to pixel units in the screen region in the image frame; subsequently the controller of the LCD may determine, for any one of the pixel units in the screen region, a target rotation angle of a liquid crystal molecule corresponding to the pixel unit based on the pixel value of the pixel point corresponding to the pixel unit, and determine the drive voltage that needs to be applied to rotate the liquid crystal molecule to the target rotation angle.

In the foregoing process, because the pixel units on the LCD correspond to the pixel points in the image frame, each screen region divided on the LCD may correspond to an image region in the image frame, and the pixel value of each pixel point in the image region determines the drive voltage of each pixel unit in the screen region. To make the liquid crystal molecule in the pixel unit present the pixel value of the corresponding pixel point, the liquid crystal molecule needs to be rotated to a target rotation angle, and the drive voltage is a voltage value required to rotate the liquid crystal molecule to the target rotation angle. In the foregoing manner, the screen region on the LCD can be precisely controlled to display the content of the corresponding image region in the image frame, thereby improving the display accuracy of the LCD.

802: The controller of the LCD outputs, for one of the plurality of screen regions, a first drive signal to a pixel unit in the screen region based on the determined drive voltage corresponding to the pixel unit, the first drive signal being used for controlling a liquid crystal molecule corresponding to the pixel unit in the screen region to rotate at the drive voltage.

In some embodiments, when the controller of the LCD outputs the first drive signals to the pixel units in the plurality of screen regions, different screen regions may be respectively driven in a certain order. That is, the controller of the LCD determines priorities for the plurality of screen regions of the LCD; and performs, in descending order of the priorities, the operation of outputting a first drive signal to a pixel unit in the screen region based on the determined drive voltage corresponding to the pixel unit.

In the foregoing process, by determining the driving order of different screen regions according to different priorities, the screen regions can be driven in an orderly manner and lit up after the rotation is completed. In addition, the driving order of the screen regions is controllable, which greatly improves the controllability and operability of the driving manner of the LCD. By setting different priorities for different screen regions, or setting a policy for determining priorities of the screen regions, precise positioning of the priorities of the screen regions can be achieved. Several different policies for determining priorities will be introduced below.

In one embodiment, the controller of the LCD may determine the priority of each screen region based on position information of the plurality of screen regions in the LCD. For example, the controller of the LCD determines, in order from top to bottom, the highest priority for the uppermost screen region in the vertical direction and the lowest priority for the lowermost screen region in the vertical direction. In another example, the controller of the LCD determines, in order from left to right, the highest priority for the leftmost screen region in the horizontal direction and the lowest priority for the rightmost screen region in the horizontal direction. The relationship between the position information and the priority is not sequentially limited in the embodiments of the present disclosure.

In the foregoing process, according to the position information of the screen regions, the driving order of the screen regions is obtained through arrangement according to positions, such as sequentially driving from top to bottom or sequentially driving from left to right, so that the driving of the screen regions in the LCD is ordered according to the positions, thereby improving the display effect of the LCD.

In one embodiment, the controller of the LCD acquires, for any one of a plurality of screen regions divided on the LCD, pixel values of pixel points corresponding to pixel units in the screen region in the image frame; and determines a priority of the screen region based on an average value of the pixel values of the pixel points, the priority of the screen region being positively correlated with the average value of the pixel values.

In the foregoing process, because each screen region in the LCD corresponds to an image region in the image frame, for any screen region, an average value of the pixel values of the pixel points in the corresponding image region may be acquired. Because the average value of the pixel values represents the amount of information contained in the entire image region, the priority may be set to be positively correlated with the average value of the pixel values, to control a screen region containing a relatively large amount of information to be driven first, thereby further improving the display effect of the LCD.

In one embodiment, the controller of the LCD determines, for any one of a plurality of screen regions divided on the LCD, pixel values of pixel points corresponding to pixel units in the screen region in the image frame; determines target pixel values of pixel points corresponding to the pixel units in the screen region in a previous frame of the image frame; acquires pixel change values between the pixel values and the target pixel values of the pixel points; and determines a priority of the screen region based on an average value of the pixel change values of the pixel points, the priority of the screen region being positively correlated with the average value of the pixel change values.

In the foregoing process, because each screen region in the LCD corresponds to an image region in the image frame, for any screen region, an average value of the pixel change values of the pixel points in the corresponding image region of the current image frame compared with the previous frame may be acquired. Because the average value of the pixel change values represents the change degree of the entire image region compared with the previous frame, the priority may be set to be positively correlated with the average value of the pixel change values, to control a screen region with a relatively great change compared with the previous frame to be driven first, thereby further improving the display effect of the LCD.

803: The controller of the LCD outputs a second drive signal to a backlight source of the LCD when the first drive signal is output to the pixel unit in the screen region (i.e., the outputting of the first drive signal is completed) and a target duration is reached, the second drive signal being used for controlling a part of the backlight source corresponding to the screen region to be turned on.

In some embodiments, for each screen region of the LCD, the controller of the LCD only performs backlighting (that is, outputs the second drive signal) at an interval of a target duration after the first drive signal is outputted, this is for waiting for the liquid crystal molecules corresponding to the pixel units in the screen region to be completely rotated. Therefore, the target duration may be set as the time required for the liquid crystal molecules corresponding to the pixel units in the current screen region to be completely rotated. Because the TFT applies a voltage to the liquid crystal molecule in the liquid crystal layer through the charging and discharging of the ITO capacitor, the process of applying the first drive signal is to charge the ITO capacitor, and the voltage between the two poles of the ITO capacitor is maintained as the drive voltage of the corresponding pixel unit, so that the liquid crystal molecule can be controlled to be rotated under the action of the drive voltage. Therefore, after a first drive signal for any screen region is outputted and the target duration is reached, the controller of the LCD may output a second drive signal to the backlight source of the LCD, to control the part of the backlight source corresponding to the screen region corresponding to the current screen region in the backlight source to be turned on, to achieve the effect of turning on the entire backlight source in partitions.

In some embodiments, the controller of the LCD may determine a loop corresponding to the screen region in a backlight circuit of the backlight source when outputting the second drive signal; and controls, through the second drive signal, the loop to be turned on, to turn on the part of the backlight source corresponding to the screen region. In the foregoing process, by setting different loops for different screen regions, when controlling a single loop corresponding to the screen region to be turned on, the other loops can be kept closed, so that only some of light sources in the entire backlight source can be turned on, to achieve the effect of lighting the screen regions in partitions.

In the foregoing process, for each screen region, once the controller of the LCD determines the drive voltages of the pixel units in the screen region, a first drive signal is immediately outputted to each pixel unit in the screen region, thereby controlling the liquid crystal molecule corresponding to each pixel unit in the screen region to be rotated. After the liquid crystal molecules corresponding to this screen region are rotated, there is no need to wait for the liquid crystal molecules corresponding to other screen regions in the LCD to be rotated. Instead, the loop corresponding to the current screen region may be directly controlled to be turned on in the backlight circuit, so that only the part of the backlight source corresponding to the screen region corresponding to the current screen region are turned on, thereby greatly shortening the waiting duration for each screen region for rotation the liquid crystal molecules.

In some embodiments, in a scenario in which the LCD plays a video stream, the GPU writes a plurality of consecutive image frames to the controller of the LCD, and the controller of the LCD receives the plurality of consecutive image frames written by the GPU. In this embodiment of the present disclosure, only a single image frame is used as an example for illustration, and for the next image frame of the image frame, the controller of the LCD may receive the next frame of the image frame. Based on the driving method involved in this embodiment of the present disclosure, the drive voltages of the pixel units in the plurality of screen regions of the LCD are determined, the first drive signals are sequentially inputted to the pixel units in the plurality of screen regions of the LCD based on the determined drive voltage corresponding to the pixel units, and for any one of the plurality of screen regions, the second drive signal is outputted to the backlight source of the LCD when the first drive signal is output to the pixel unit in the screen region and a target duration is reached. By analogy, the plurality of consecutive image frames are lit in partitions and displayed on the LCD, and details are not described herein again.

Any combination of the foregoing technical solutions may be used to form an embodiment of the present disclosure. Details are not described herein again.

According to the method provided in this embodiment of the present disclosure, by dividing an LCD into a plurality of screen regions, outputting a first drive signal to each pixel unit in each screen region, and after completion of controlling liquid crystal molecules in the current screen region to rotate, directly outputting a second drive signal to a backlight source without waiting for completion of rotation of all liquid crystal molecules in other screen regions, to control some of light sources corresponding to the current screen region to be turned on, a waiting duration of each screen region in the LCD during the backlighting process is reduced, and the reduced waiting duration can be used for a controller of the LCD to receive a larger amount of data writing, thereby greatly improving the LCD resolution without decreasing the LCD refresh rate.

Figure 9:
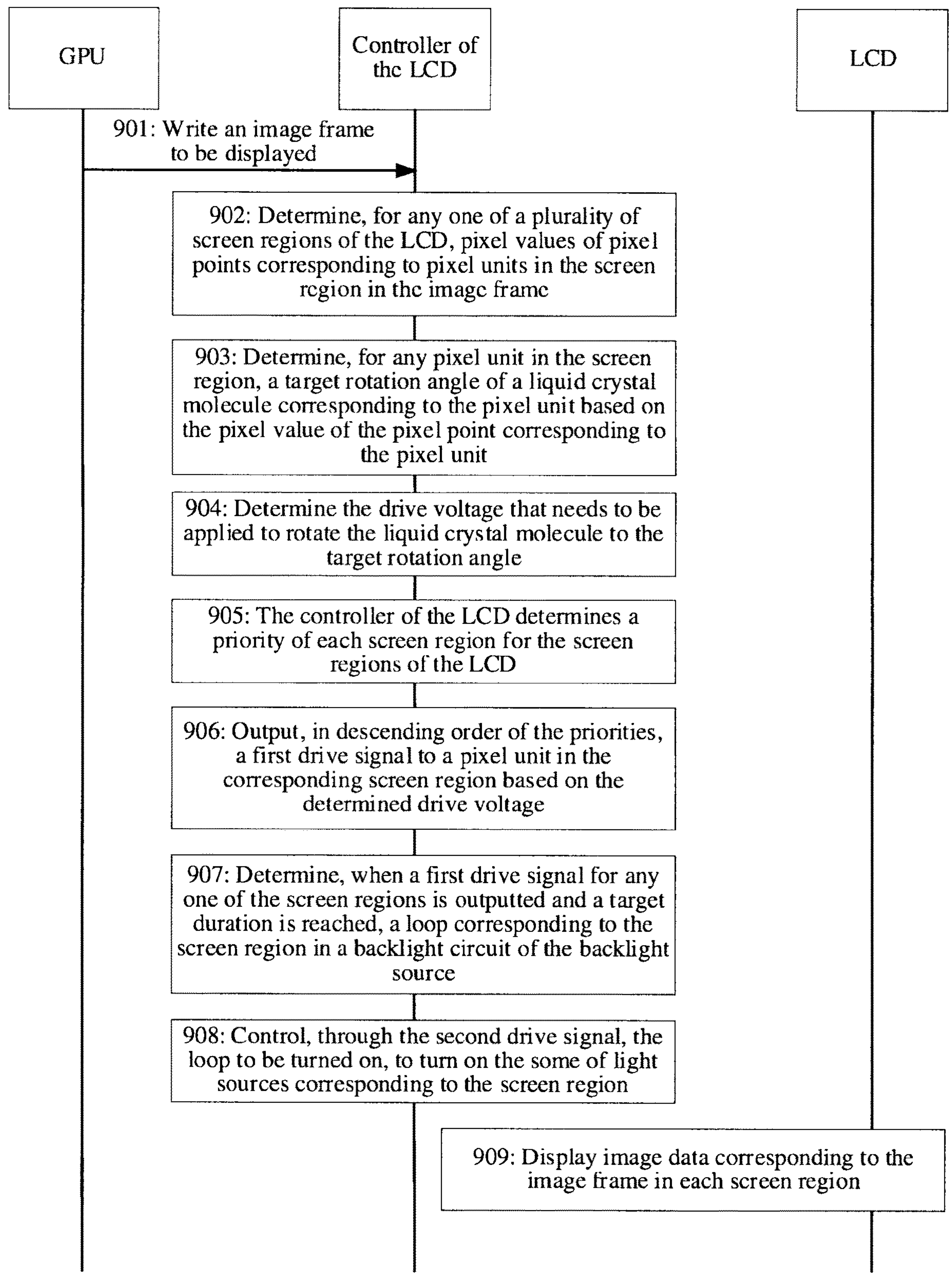
FIG. 9 is an interaction flowchart of an LCD driving method according to an embodiment of the present disclosure.

FIG. 9 is an interaction flowchart of an LCD driving method according to an embodiment of the present disclosure. Referring to FIG. 9, the LCD driving method is applied to an electronic device having an LCD. In an embodiment, the electronic device may also be referred to as user equipment, a display device, a user terminal, a terminal device, a terminal, or the like. The embodiment includes the following steps 901 to 909:

901: A GPU of the electronic device writes an image frame to be displayed into a controller of the LCD of the electronic device.

In some embodiments, the electronic device may be a display device that supports an LCD, such as a smartphone, a tablet computer, a notebook computer, a desktop computer, a smart speaker, a smartwatch, an e-book reader, or the like, but is not limited thereto.

In some embodiments, the electronic device may be a VR device, such as a VR helmet or VR glasses. The LCD is a display component of the VR device. In this case, the image frame to be displayed may be a VR image frame, where VR refers to a computer-generated three-dimensional virtual environment that can make the user be immersed and is isolated from the real environment.

In some embodiments, the electronic device may alternatively be an MR device, such as an MR helmet or MR glasses. The LCD is a display component of the MR device. In this case, the image frame to be displayed may be an MR image frame, where MR refers to mixing the real environment and the virtual environment through a hologram, and may also be regarded as a mixture of VR and AR.

In some embodiments, the GPU of the electronic device receives the image frame to be displayed sent by the CPU, and sends the image frame to be displayed to the controller of the LCD. The image frame may be any frame in the consecutive image frames in the video stream, or may be a separate to-be-displayed image that does not belong to the video stream. In an embodiment, the video stream may be a regular video stream, a VR video stream, an MR video stream, or the like. Similarly, the corresponding image frames may be regular image frames, VR image frames, MR image frames, or the like. This is not specifically limited in the embodiments of the present disclosure.

902: The controller of the LCD determines, for any one of a plurality of screen regions of the LCD, pixel values of pixel points corresponding to pixel units in the screen region in the image frame.

In some embodiments, because the LCD involved in this embodiment of the present disclosure may be an LCD that supports partitions for backlighting, the controller of the LCD may determine, for any one of a plurality of screen regions divided on the LCD, pixel values of pixel points corresponding to pixel units in the screen region in the image frame. In an embodiment, the controller of LCD queries, for each pixel point in the image frame, screen coordinates corresponding to the pixel point according to a mapping relationship between the pixel points and screen coordinates, and the pixel unit corresponding to the screen coordinates is the pixel unit corresponding to the pixel point. The foregoing operation is performed on each pixel point, and the pixel unit corresponding to each pixel point can be obtained. Subsequently, for each screen region, the pixel values of the pixel points corresponding to the pixel units in the screen region can be obtained.

903: The controller of the LCD determines, for any pixel unit in the screen region, a target rotation angle of a liquid crystal molecule corresponding to the pixel unit based on the pixel value of the pixel point corresponding to the pixel unit.

In some embodiments, for each pixel unit, the controller of the LCD may determine the target rotation angle of a liquid crystal molecule according to the pixel value of the corresponding pixel point based on the optical principle, so that after the light passes through layers of the LCD, the pixel unit can present a color indicated by the pixel value of the corresponding pixel point.

904: The controller of the LCD determines the drive voltage that needs to be applied to rotate the liquid crystal molecule to the target rotation angle.

In some embodiments, because the LCD includes a liquid crystal layer, there are a gate and a source of the TFT at both ends of the liquid crystal layer, and the voltage difference between the gate and the source can control the liquid crystal molecule to be rotated. In an embodiment, the sources of all liquid crystal molecules in the liquid crystal layer are set to the same value (that is, sharing the source, which can be regarded as grounding), so that it is only necessary to determine the voltage difference required for the rotation of the liquid crystal molecule according to the target rotation angle, and use the voltage difference and the shared voltage of the sources to determine the drive voltage of the gate.

In the foregoing steps 902 to 904, the controller of the LCD determines drive voltages of pixel units in the screen regions of the LCD based on an image frame to be displayed. Because the pixel units on the LCD correspond to the pixel points in the image frame, each screen region divided on the LCD may correspond to an image region in the image frame, and the pixel value of each pixel point in the image region determines the drive voltage of each pixel unit in the screen region. To make the liquid crystal molecule in the pixel unit present the pixel value of the corresponding pixel point, the liquid crystal molecule needs to be rotated to a target rotation angle, and the drive voltage is a voltage value required to rotate the liquid crystal molecule to the target rotation angle. In the foregoing manner, the screen region on the LCD can be precisely controlled to display the content of the corresponding image region in the image frame, thereby improving the display accuracy of the LCD.

905: The controller of the LCD determines priorities for the plurality of screen regions of the LCD.

In one embodiment, the controller of the LCD may determine the priority of each screen region based on position information of the plurality of screen regions in the LCD. For example, the controller of the LCD determines, in order from top to bottom, the highest priority for the uppermost screen region in the vertical direction and the lowest priority for the lowermost screen region in the vertical direction. In another example, the controller of the LCD determines, in order from left to right, the highest priority for the leftmost screen region in the horizontal direction and the lowest priority for the rightmost screen region in the horizontal direction. The relationship between the position information and the priority is not sequentially limited in the embodiments of the present disclosure.

In the foregoing process, according to the position information of the screen regions, the driving order of the screen regions is obtained through arrangement according to positions, such as sequentially driving from top to bottom or sequentially driving from left to right, so that the driving of the screen regions in the LCD is ordered according to the positions, thereby improving the display effect of the LCD.

In one embodiment, the controller of the LCD acquires, for any one of a plurality of screen regions divided on the LCD, pixel values of pixel points corresponding to pixel units in the screen region in the image frame; and determines a priority of the screen region based on an average value of the pixel values of the pixel points, the priority of the screen region being positively correlated with the average value of the pixel values.

In the foregoing process, because each screen region in the LCD corresponds to an image region in the image frame, for any screen region, an average value of the pixel values of the pixel points in the corresponding image region may be acquired. Because the average value of the pixel values represents the amount of information contained in the entire image region, the priority may be set to be positively correlated with the average value of the pixel values, to control a screen region containing a relatively large amount of information to be driven first, thereby further improving the display effect of the LCD.

In one embodiment, the controller of the LCD determines, for any one of a plurality of screen regions divided on the LCD, pixel values of pixel points corresponding to pixel units in the screen region in the image frame; determines target pixel values of pixel points corresponding to the pixel units in the screen region in a previous frame of the image frame; acquires pixel change values between the pixel values and the target pixel values of the pixel points; and determines a priority of the screen region based on an average value of the pixel change values of the pixel points, the priority of the screen region being positively correlated with the average value of the pixel change values.

In the foregoing process, because each screen region in the LCD corresponds to an image region in the image frame, for any screen region, an average value of the pixel change values of the pixel points in the corresponding image region of the current image frame compared with the previous frame may be acquired. Because the average value of the pixel change values represents the change degree of the entire image region compared with the previous frame, the priority may be set to be positively correlated with the average value of the pixel change values, to control a screen region with a relatively great change compared with the previous frame to be driven first, thereby further improving the display effect of the LCD.

906: The controller of the LCD outputs, in descending order of the priorities, a first drive signal to a pixel unit in the corresponding screen region based on the determined drive voltage corresponding to the pixel unit, the first drive signal being used for controlling a liquid crystal molecule corresponding to the pixel unit in the screen region to rotate at the drive voltage.

In some embodiments, after the priority of each screen region is determined, a corresponding first drive signal is first generated for a pixel unit in the screen region with the highest priority based on the determined drive voltage corresponding to the pixel unit, and the first drive signal is outputted to the pixel unit. Subsequently, the foregoing operations are performed on the screen region with the second highest priority, and so on, until the foregoing operations are performed on all the screen regions, thereby completing the driving and rotation of all liquid crystal molecules in the entire LCD screen.

In the foregoing process, by determining the driving order of different screen regions according to different priorities, the screen regions can be driven in an orderly manner and lit up after the rotation is completed. In addition, the driving order of the screen regions is controllable, which greatly improves the controllability and operability of the driving manner of the LCD. By setting different priorities for different screen regions, or setting a policy for determining priorities of the screen regions, precise positioning of the priorities of the screen regions can be achieved. Several different policies for determining priorities will be introduced below.

907: The controller of the LCD determines, when a first drive signal for any screen region is outputted and a target duration is reached, a loop corresponding to the screen region in a backlight circuit of the backlight source.

In some embodiments, for each screen region of the LCD, the controller of the LCD only performs backlighting (that is, outputs the second drive signal) at an interval of a target duration after the first drive signal is outputted, this is for waiting for the liquid crystal molecules corresponding to the pixel units in the screen region to be completely rotated. Because the TFT applies a voltage to the liquid crystal molecule in the liquid crystal layer through the charging and discharging of the ITO capacitor, the process of applying the first drive signal is to charge the ITO capacitor, and the voltage between the two poles of the ITO capacitor is maintained as the drive voltage of the corresponding pixel unit, so that the liquid crystal molecule can be controlled to be rotated under the action of the drive voltage. Therefore, in all the screen regions of the LCD, when a first drive signal for any screen region is outputted and a target duration is reached, the controller of the LCD may determine a loop corresponding to the screen region in a backlight circuit of the backlight source.

In some embodiments, the controller of the LCD may determine the loop corresponding to the screen region according to a mapping relationship between the screen regions and loops. For example, the mapping relationship may be a position correspondence between the screen regions and the loops, or may be a preset correspondence. This is not limited in the embodiments of the present disclosure.

908. The controller of the LCD controls, through the second drive signal, the loop to be turned on, to turn on the part of the backlight source corresponding to the screen region corresponding to the screen region, the second drive signal being used for controlling the part of the backlight source corresponding to the screen region corresponding to the screen region to be turned on.

In some embodiments, the controller of the LCD may set the switch of the loop to an on state, to turn on the loop, so as to charge the IPO capacitor corresponding to each pixel unit. Because the voltage difference between the gate and the source can be kept constant after the charging of the IPO capacitor is completed, it is not necessary to turn on the switch of the loop all the time. Instead, after the switch of the loop is turned on and the charging of the IPO capacitor is completed, the switch of the loop may be turned off to save energy.

In the foregoing process, by setting different loops for different screen regions, when controlling a single loop corresponding to the screen region to be turned on, the other loops can be kept closed, so that only some of light sources in the entire backlight source can be turned on, to achieve the effect of lighting the screen regions in partitions.

In the foregoing steps 907 and 908, when a first drive signal for any screen region is outputted and a target duration is reached, the controller of the LCD may output a second drive signal to the backlight source of the LCD. That is, for each screen region, once the controller of the LCD determines the drive voltages of pixel units in the screen region, a first drive signal is immediately outputted to each pixel unit in the screen region, thereby controlling a liquid crystal molecule corresponding to each pixel unit in the screen region to be rotated. After the liquid crystal molecules corresponding to this screen region are rotated, there is no need to wait for the liquid crystal molecules corresponding to other screen regions in the LCD to be rotated. Instead, the loop corresponding to the current screen region may be directly controlled to be turned on in the backlight circuit, so that only the part of the backlight source corresponding to the screen region corresponding to the current screen region are turned on, thereby greatly shortening the waiting duration for each screen region for rotation the liquid crystal molecules.

909. The LCD of the electronic device displays image data corresponding to the image frame in each screen region.

In some embodiments, for each screen region in the LCD, after the liquid crystal molecules are rotated and the corresponding loop is turned on (that is, backlighted), the corresponding image region (that is, image data) in the image frame will be displayed in the current screen region. Although this manner will cause different image regions in this image frame to be displayed sequentially, by using the visual persistence characteristic of the human eyes, provided that the display time difference between the image regions is maintained to not exceeding the threshold that the human eyes can perceive, the visual presentation effect of the image frame can be ensured to be not affected.

In some embodiments, in a scenario in which the LCD plays a video stream, the GPU writes a plurality of consecutive image frames to the controller of the LCD, and the controller of the LCD receives the plurality of consecutive image frames written by the GPU. In this embodiment of the present disclosure, only a single image frame is used as an example for illustration, and for the next image frame of the image frame, the controller of the LCD may receive the next frame of the image frame; and based on the driving method involved in this embodiment of the present disclosure, determine the drive voltages of the pixel units in the plurality of screen regions of the LCD, sequentially input the first drive signals to the pixel units in the plurality of screen regions of the LCD based on the determined drive voltage corresponding to the pixel units, and output, for any one of the plurality of screen regions, the second drive signal to the backlight source of the LCD when the first drive signal is output to the pixel unit in the screen region and a target duration is reached. In other words, operations similar to the foregoing steps 901 to 909 are performed on the next frame, and so on, so that the plurality of consecutive image frames are lit in partitions and displayed on the LCD. Details are not described herein again.

Any combination of the foregoing technical solutions may be used to form an embodiment of the present disclosure. Details are not described herein again.

According to the method provided in this embodiment of the present disclosure, by dividing an LCD into a plurality of screen regions, outputting a first drive signal to each pixel unit in each screen region, and after completion of controlling liquid crystal molecules in the current screen region to rotate, directly outputting a second drive signal to a backlight source without waiting for completion of rotation of all liquid crystal molecules in other screen regions, to control some of light sources corresponding to the current screen region to be turned on, a waiting duration of each screen region in the LCD during the backlighting process is reduced, and the reduced waiting duration can be used for a controller of the LCD to receive a larger amount of data writing, thereby greatly improving the LCD resolution without decreasing the LCD refresh rate.

FIG. 10 is a schematic principle diagram of a partition manner of an LCD according to an embodiment of the present disclosure. As shown in FIG. 10, the Mini LED backlight panel of the LCD is divided into five regions 1001 to 1005, and these five regions are sequentially arranged from left to right. The controller of the LCD may control these five regions to be lit in different time periods through the second drive signal. In an embodiment, if these five regions are regarded as a unified part, the entire LCD panel can be uniformly lit simultaneously. The lower half 1010 in FIG. 10 is a curve diagram of the time axis and the brightness change of each region. The regions 1001 to 1005 are respectively lit in sequence in an arrangement order from left to right. It can be seen from the figure that the regions 1001 to 1005 can achieve the effect of asynchronous lighting.

FIG. 11 is a schematic logical diagram of a backlight circuit according to an embodiment of the present disclosure. As shown at 1100 in FIG. 11, on the basis of dividing the Mini LED backlight panel into five regions 1001 to 1005 as shown in FIG. 10, correspondingly, five loops are provided in the entire backlight circuit, which are respectively configured for controlling whether to turn on some of light sources respectively corresponding to the regions 1001 to 1005 in the backlight source.

FIG. 12 is a schematic principle diagram of a partition manner of an LCD according to an embodiment of the present disclosure. As shown in FIG. 12, the Mini LED backlight panel of the LCD is divided into 25 regions 1201 to 1225, and these 25 regions are sequentially arranged as five rows and five columns from left to right and from top to bottom. The controller of the LCD may control these 25 regions to be lit in different time periods through the second drive signal. In an embodiment, if these 25 regions are regarded as a unified part, the entire LCD panel may be uniformly lit simultaneously. Certainly, a plurality of regions in these 25 regions may alternatively be regarded as a combined part, so that the plurality of regions are uniformly lit. For example, the regions 1201, 1207, 1213, 1219, and 1225 are regarded as a combined part, and the regions 1201, 1207, 1213, 1219, and 1225 are uniformly lit or off. Compared with the manner of dividing into five regions provided in FIG. 10, dividing into 25 regions provided in FIG. 12 can further improve the refined display requirement of LCD partition lighting. Dividing into 25 regions is merely an exemplary description for the division manner of the Mini LED backlight panel. More or fewer regions may be obtained through division according to the actual display requirements, provided that it can be ensured that each region supports local lighting in sequence. In this embodiment of the present disclosure, the duration for waiting for the remaining liquid crystal molecules to be rotated after the image signal is written can be reduced in a local lighting manner, so that the reduced duration can be used to write a larger amount of data, thereby providing higher resolution while maintaining a certain refresh rate. In addition, the reduced waiting duration can also be used to increase the lighting duration of the backlight panel, so that the LCD can perform display with a larger brightness value and a larger brightness range, and further improve the display effect of the LCD.

Figure 13:
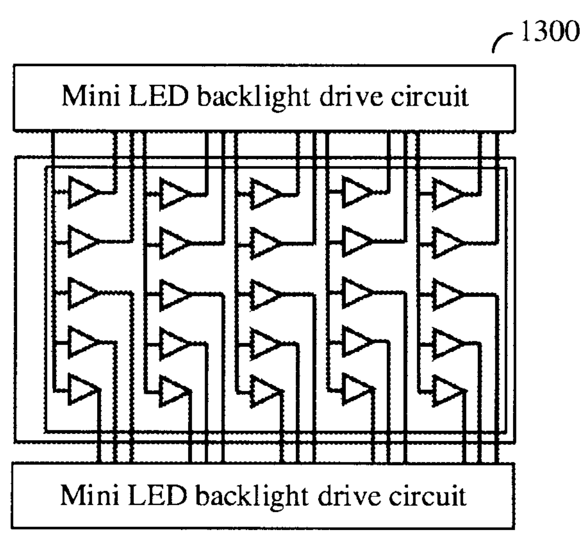
FIG. 13 is a schematic logical diagram of a backlight circuit according to an embodiment of the present disclosure.

FIG. 13 is a schematic logical diagram of a backlight circuit according to an embodiment of the present disclosure. As shown at 1300 in FIG. 13, on the basis of dividing the Mini LED backlight panel into 25 regions 1201 to 1225 as shown in FIG. 12, correspondingly, 25 loops are provided in the entire backlight circuit, which are respectively configured for controlling whether to turn on some of light sources respectively corresponding to the regions 1201 to 1225 in the backlight source.

Figure 14:
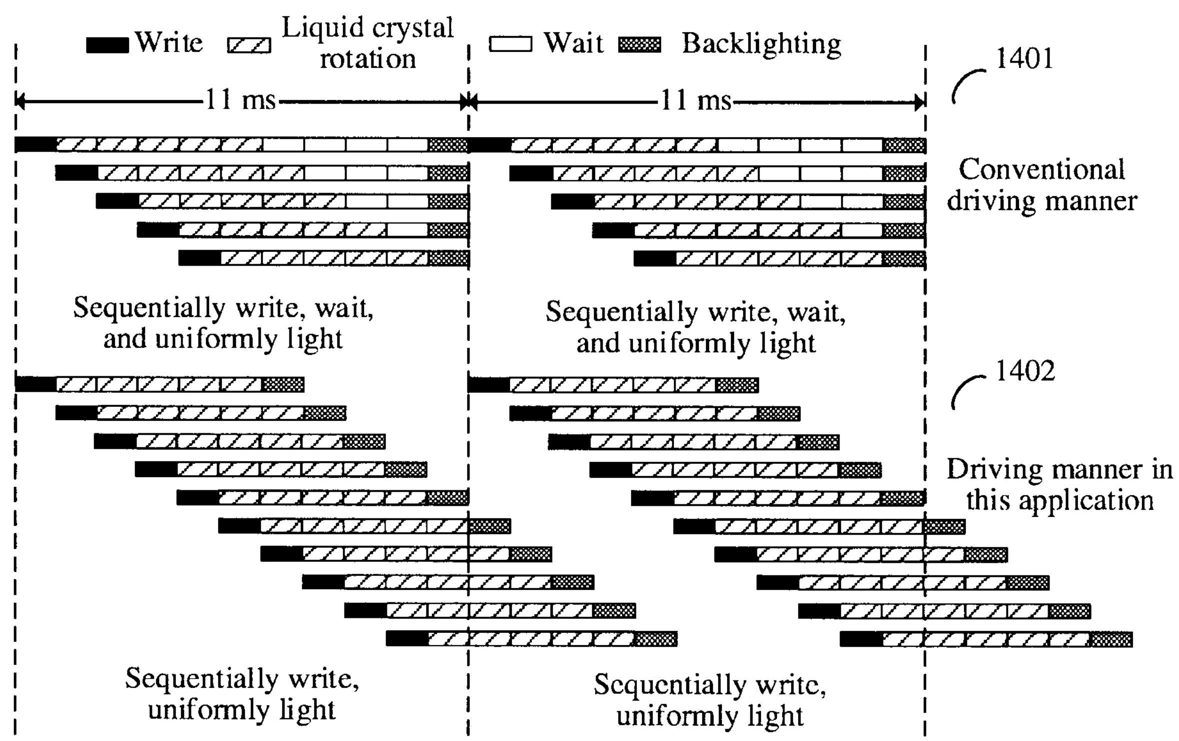
FIG. 14 is a principle comparison diagram of driving manners of an LCD according to an embodiment of the present disclosure.

FIG. 14 is a principle comparison diagram of driving manners of an LCD according to an embodiment of the present disclosure. As shown in FIG. 14, an example in which the screen refresh rate is 90 Hz is used, a duration of each image frame is 11 ms, and each grid represents 1 ms. In the backlighting manner shown in 1401, an example in which the LCD is divided into five screen regions is used. For each screen region, after image data is written and the liquid crystal molecules are rotated, only after all the liquid crystal molecules in other screen regions are rotated, all the screen regions of the entire LCD can be uniformly lit, and then the writing stage of the next frame of image data is started. However, in the Mini LED-based backlighting manner provided in this embodiment of the present disclosure shown in 1402, an example which the LCD is divided into ten screen regions is used. For each screen region, after image data is written and the liquid crystal molecules are rotated, this screen region can be individually lit, while other screen regions are still off, so that the writing of image data and rotation of liquid crystal molecules in other screen regions will not be affected, thereby reducing the waiting duration for each screen region.

Figure 15:
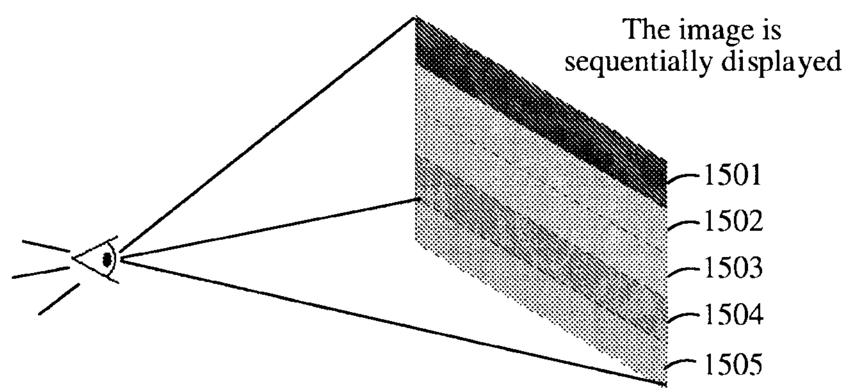
FIG. 15 is a schematic diagram of display effect of a driving manner of an LCD according to an embodiment of the present disclosure.

FIG. 15 is a schematic diagram of display effect of a driving manner of an LCD according to an embodiment of the present disclosure. As shown in FIG. 15, when the LCD displays an image frame, actually, the image content of a region 1501 is first displayed, and then the respective image content of regions 1502, 1503, 1504, and 1505 are sequentially displayed. However, by using the visual persistence characteristic of the human eyes, the human eyes cannot detect that the image frame is displayed sequentially in regions, so that the display effect of the LCD will not be affected.

Figure 16:
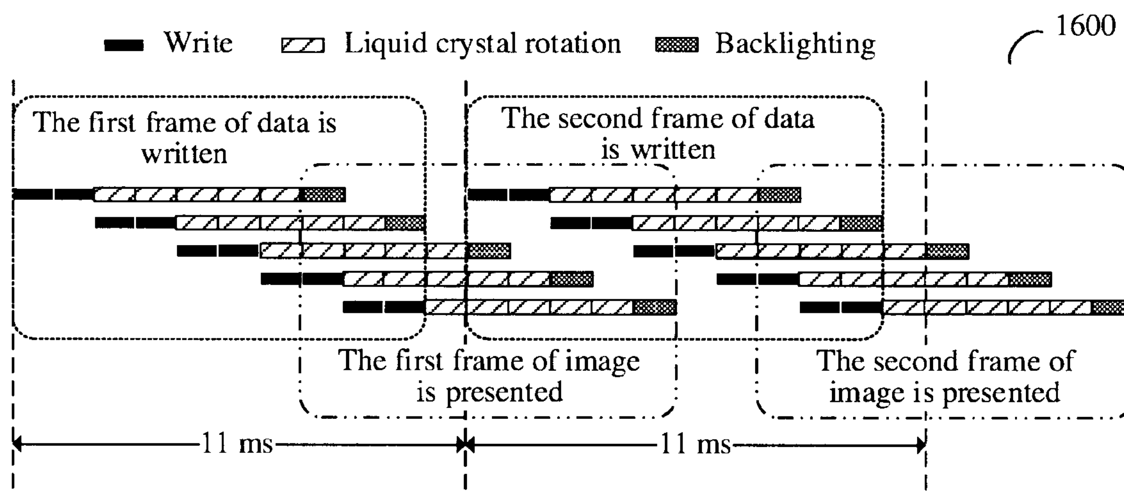
FIG. 16 is a schematic principle diagram of a driving manner of an LCD according to an embodiment of the present disclosure.

FIG. 16 is a schematic principle diagram of a driving manner of an LCD according to an embodiment of the present disclosure. As shown at 1600 in FIG. 16, after the image data of each screen region is written, the rotation stage of the liquid crystal molecules in this screen region is immediately entered, and after the liquid crystal molecules are rotated, the backlighting stage of this screen region is immediately entered, so that the backlighting of the screen regions is performed asynchronously, and there is no need to wait for the liquid crystal molecules in other screen regions to be rotated and then perform lighting uniformly. In an example backlighting manner based on a light guide plate, only uniform lighting can be performed. Therefore, when the image data in all the screen regions of the entire LCD is not completely written, and the liquid crystal molecules in all the screen regions are not completely rotated, the backlight source cannot be turned on; otherwise, the complete image content of this frame of image cannot be presented. However, by using the LCD based on the Mini LED backlight source provided in this embodiment of the present disclosure, during display of the image frame, due to the use of the visual persistence characteristic of the human eyes, when the image data is written and the liquid crystal molecules are completely rotated in a local region, the local region can be lit to realize the partial presentation of the image. Although image data writing and liquid crystal rotation occur sequentially, provided that the duration for image data writing and sequential generated liquid crystal rotation does not exceed a threshold that the human eyes can perceive, the presentation effect of the image frame will not be damaged. Therefore, the technical solution provided in this embodiment of the present disclosure can maximize the image display of each core program, maximize the use of the image refresh interval, and improve the parameter specifications of the TFT LCD.

Figure 17:
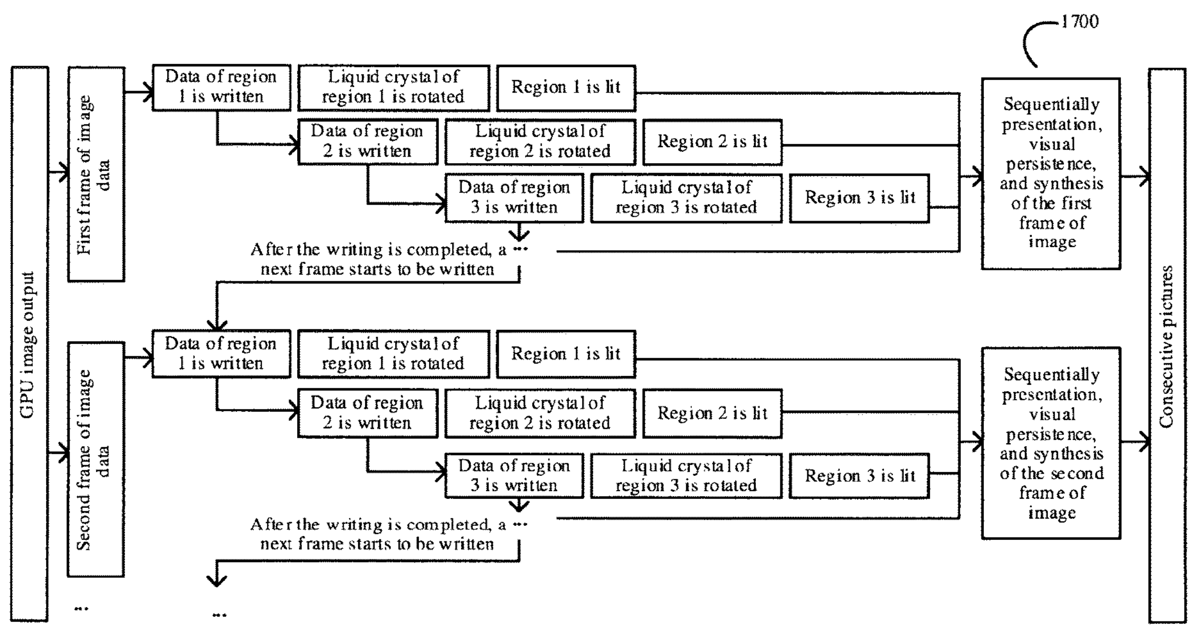
FIG. 17 is another schematic principle diagram of a driving manner of an LCD according to an embodiment of the present disclosure.

FIG. 17 is another schematic principle diagram of a driving manner of an LCD according to an embodiment of the present disclosure. As shown at 1700 in FIG. 17, the GPU outputs a plurality of consecutive image frames to the controller of the LCD, and the controller of the LCD receives the plurality of image frames, and performs image data writing of a plurality of screen regions respectively for the first frame of image data. The writing process involved in this embodiment of the present disclosure includes: determining drive voltages of pixel units according to the pixel values of the pixel points; subsequently, after the image data of each screen region is written, rotation the liquid crystal molecules in each screen region; and after the liquid crystal molecules in each screen region are rotated, turning on some of light sources in the backlight source of each screen region. For the first frame of image, after the plurality of screen regions are lit, although the plurality of screen regions present image content sequentially, a complete first frame of image can be synthesized by using visual persistence characteristic. After writing for the plurality of screen regions in the first frame of image are completed, writing of the second frame of image starts, and similar operations are performed on the second frame of image. Details are not described herein.

Figures 18, 19:
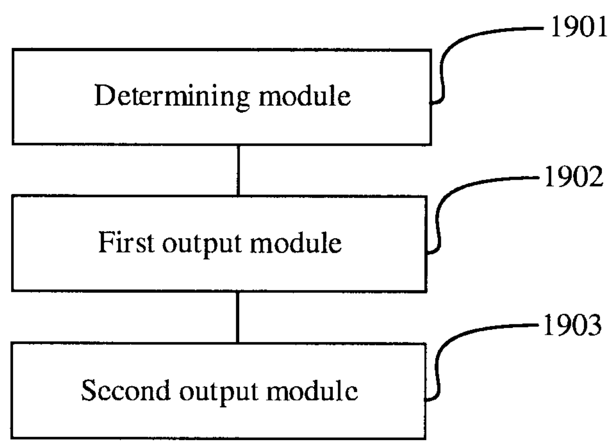
FIG. 18 is a schematic diagram of a Mini LED backlight panel according to an embodiment of the present disclosure.
FIG. 19 is a schematic structural diagram of a driving apparatus of an LCD according to an embodiment of the present disclosure.

FIG. 18 is a schematic diagram of a Mini LED backlight panel according to an embodiment of the present disclosure. As shown at 1800 in FIG. 18, each pixel unit in the Mini LED backlight panel may correspond to a separate partial backlight source, so that separate lighting can be implemented in the same screen region without affecting the backlight source of other screen regions. Therefore, the limitation that the entire light guide plate needs to be uniformly lit is broken. In the writing cycle of the entire image frame, the time may be allocated to data writing, so that there is continuous image data written into the controller of the LCD throughout the image display stage. For a screen region in which the image data is written first, liquid crystal rotation is performed first, and the backlighting is performed first. In the case of a high refresh rate, partial lighting of the plurality of screen regions will be presented as a complete image due to the visual persistence characteristic the human eyes, which will not affect the display effect of the LCD. Because the refresh interval can be fully used, the GPU can write more image data into the controller of the LCD without changing the existing process and material characteristics, thereby meeting the demand for higher resolution. In addition, the waiting duration reduced in which manner may also be used to increase the lighting duration during display of the entire image frame, or may be used to increase the refresh rate when the resolution is maintained, so as to reserve a margin for subsequent application of the LCD, to facilitate the improvement of its subsequent parameter specifications.

In an exemplary embodiment, a display apparatus having an LCD is provided, the apparatus includes: an optical lens module, a display module of an LCD, a Mini LED backlight module of the LCD, and a driver chip of the LCD.

The structural relationship between the optical lens module, the display module, and the Mini LED backlight module is shown in FIG. 5. The Mini LED backlight module is configured to provide a backlight source for the display module, the display module refers to the "screen" of the LCD in the usual sense, and the optical lens module is configured to refract light emitted by the LCD.

The module structure of the display module may be shown in FIG. 6, which includes from top to bottom: an upper polarizer, a color filter plate, a liquid crystal layer, a TFT, and a lower polarizer. Both the upper polarizer and the lower polarizer are configured to polarize and filter the light. The color filter plate is configured to filter the white light emitted by the light source into colored light in red, green, and blue. The liquid crystal layer includes liquid crystal molecules, and the TFT is configured to control, through a drive voltage, a liquid crystal molecule to be rotated.

The module structure of the Mini LED backlight module may alternatively be shown in FIG. 6, including from top to bottom: an anti-glare film, an upper substrate, an RGB Mini LED, electrodes, and a lower substrate. The anti-glare film is configured to prevent glare, and the glare is a bad lighting phenomenon. The upper substrate and the lower substrate are the main substrate structure of the Mini LED. The RGB Mini LED is configured to provide the backlight source for the display module. The electrodes are configured to determine the on/off state of each loop in the RGB Mini LED and a voltage in the loop in an on state.

The driver chip is configured to: determine drive voltages of pixel units in a plurality of screen regions of the LCD based on an image frame to be displayed; output, for any one of the plurality of screen regions, a first drive signal to a pixel unit in the screen region based on the determined drive voltage corresponding to the pixel unit, the first drive signal being used for controlling a liquid crystal molecule corresponding to the pixel unit in the screen region to rotate at the drive voltage; and output a second drive signal to the Mini LED backlight module when the first drive signal is output to the pixel unit in the screen region and a target duration is reached, the second drive signal being used for controlling a part of the backlight source corresponding to the screen region to be turned on.

According to the apparatus provided in this embodiment of the present disclosure, by dividing an LCD into a plurality of screen regions, outputting a first drive signal to each pixel unit in each screen region, and after completion of controlling liquid crystal molecules in the current screen region to rotate, directly outputting a second drive signal to a backlight source without waiting for completion of rotation of all liquid crystal molecules in other screen regions, to control some of light sources corresponding to the current screen region to be turned on, a waiting duration of each screen region in the LCD during the backlighting process is reduced, and the reduced waiting duration can be used for a controller of the LCD to receive a larger amount of data writing, thereby greatly improving the LCD resolution without decreasing the LCD refresh rate.

In one embodiment, the driver chip is configured to:

determine priorities for the plurality of screen regions of the LCD; and perform, in descending order of the priorities, the operation of outputting a first drive signal to a pixel unit in the screen region based on the determined drive voltage corresponding to the pixel unit.

In one embodiment, the driver chip is configured to:

determine the priority of each screen region based on position information of the plurality of screen regions in the LCD.

In one embodiment, the driver chip is configured to:

acquire, for any screen region, pixel values of pixel points corresponding to pixel units in the screen region in the image frame; and determine a priority of the screen region based on an average value of the pixel values of the pixel points, the priority of the screen region being positively correlated with the average value of the pixel values.

In one embodiment, the driver chip is configured to:

determine, for any screen region, pixel values of pixel points corresponding to pixel units in the screen region in the image frame;

determine target pixel values of pixel points corresponding to the pixel units in the screen region in a previous frame of the image frame;

acquire pixel change values between the pixel values and the target pixel values of the pixel points; and determine a priority of the screen region based on an average value of the pixel change values of the pixel points, the priority of the screen region being positively correlated with the average value of the pixel change values.

In one embodiment, the driver chip is configured to:

determine, for any screen region, pixel values of pixel points corresponding to pixel units in the screen region in the image frame;

determine, for any one of the pixel units, a target rotation angle of a liquid crystal molecule corresponding to the pixel unit based on the pixel value of the pixel point corresponding to the pixel unit; and determine the drive voltage that needs to be applied to rotate the liquid crystal molecule to the target rotation angle.

In one embodiment, the driver chip is configured to:

determine a loop corresponding to the screen region in a backlight circuit of the backlight source; and control, through the second drive signal, the loop to be turned on, to turn on the part of the backlight source corresponding to the screen region.

In one embodiment, the driver chip is configured to:

receive a next image frame of the image frame; and determine the drive voltages of the pixel units in the plurality of screen regions of the LCD, sequentially input the first drive signals to the pixel units in the plurality of screen regions of the LCD based on the determined drive voltage corresponding to the pixel units, and output, for any one of the plurality of screen regions, the second drive signal to the backlight source of the LCD when the first drive signal is output to the pixel unit in the screen region and a target duration is reached.

In one embodiment, the LCD is a display component of a VR device, and the image frame is a VR image frame.

Any combination of the foregoing technical solutions may be used to form an embodiment of the present disclosure. Details are not described herein again.

FIG. 19 is a schematic structural diagram of a driving apparatus of an LCD according to an embodiment of the present disclosure. As shown in FIG. 19, the apparatus includes:

a determining module 1901, configured to determine drive voltages of pixel units in a plurality of screen regions of the LCD based on an image frame to be displayed;

a first output module 1902, configured to output, for any one of the plurality of screen regions, a first drive signal to a pixel unit in the screen region based on the determined drive voltage corresponding to the pixel unit, the first drive signal being used for controlling a liquid crystal molecule corresponding to the pixel unit in the screen region to rotate at the drive voltage; and a second output module 1903, configured to output a second drive signal to a backlight source of the LCD when the first drive signal is output to the pixel unit in the screen region and a target duration is reached, the second drive signal being used for controlling a part of the backlight source corresponding to the screen region to be turned on.

According to the apparatus provided in this embodiment of the present disclosure, by dividing an LCD into a plurality of screen regions, outputting a first drive signal to each pixel unit in each screen region, and after completion of controlling liquid crystal molecules in the current screen region to rotate, directly outputting a second drive signal to a backlight source without waiting for completion of rotation of all liquid crystal molecules in other screen regions, to control some of light sources corresponding to the current screen region to be turned on, a waiting duration of each screen region in the LCD during the backlighting process is reduced, and the reduced waiting duration can be used for a controller of the LCD to receive a larger amount of data writing, thereby greatly improving the LCD resolution without decreasing the LCD refresh rate.

In one embodiment, based on the apparatus composition of FIG. 19, the first output module 1902 includes:

a determining unit, configured to determine priorities for the plurality of screen regions of the LCD; and perform, in descending order of the priorities, the operation of outputting a first drive signal to a pixel unit in the screen region based on the determined drive voltage corresponding to the pixel unit.

In one embodiment, the determining unit is configured to: determine the priority of each screen region based on position information of the plurality of screen regions in the LCD.

In one embodiment, the determining unit is configured to: acquire, for any screen region, pixel values of pixel points corresponding to pixel units in the screen region in the image frame; and determine a priority of the screen region based on an average value of the pixel values of the pixel points, the priority of the screen region being positively correlated with the average value of the pixel values.

In one embodiment, the determining unit is configured to: determine, for any screen region, pixel values of pixel points corresponding to pixel units in the screen region in the image frame;

determine target pixel values of pixel points corresponding to the pixel units in the screen region in a previous frame of the image frame;

acquire pixel change values between the pixel values and the target pixel values of the pixel points; and determine a priority of the screen region based on an average value of the pixel change values of the pixel points, the priority of the screen region being positively correlated with the average value of the pixel change values.

In one embodiment, the determining module 1901 is configured to:

determine, for any screen region, pixel values of pixel points corresponding to pixel units in the screen region in the image frame;

determine, for any one of the pixel units, a target rotation angle of a liquid crystal molecule corresponding to the pixel unit based on the pixel value of the pixel point corresponding to the pixel unit; and determine the drive voltage that needs to be applied to rotate the liquid crystal molecule to the target rotation angle.

In one embodiment, the second output module 1903 is configured to:

determine a loop corresponding to the screen region in a backlight circuit of the backlight source; and control, through the second drive signal, the loop to be turned on, to turn on the part of the backlight source corresponding to the screen region.

In one embodiment, based on the apparatus composition of FIG. 19, the apparatus further includes:

a receiving module, configured to: receive a next image frame of the image frame; and determine the drive voltages of the pixel units in the plurality of screen regions of the LCD, sequentially input the first drive signals to the pixel units in the plurality of screen regions of the LCD based on the determined drive voltage corresponding to the pixel units, and output, for any one of the plurality of screen regions, the second drive signal to the backlight source of the LCD when the first drive signal is output to the pixel unit in the screen region and a target duration is reached.

In one embodiment, the LCD is a display component of a VR device, and the image frame is a VR image frame.

Any combination of the foregoing technical solutions may be used to form an embodiment of the present disclosure. Details are not described herein again.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

When the driving apparatus of an LCD provided in the foregoing embodiments drives an LCD, the division of the foregoing functional modules is merely used as an example for description. In actual applications, the foregoing functions can be allocated to different functional modules according to a requirement. That is, an inner structure of the electronic device is divided into different functional modules to complete all or some of the functions described above. In addition, the driving apparatus of an LCD provided in the foregoing embodiment and the embodiments of the LCD driving method belong to the same conception. For the specific implementation process, reference may be made to the embodiments of the LCD driving method, and details are not described herein again.

Figure 20:
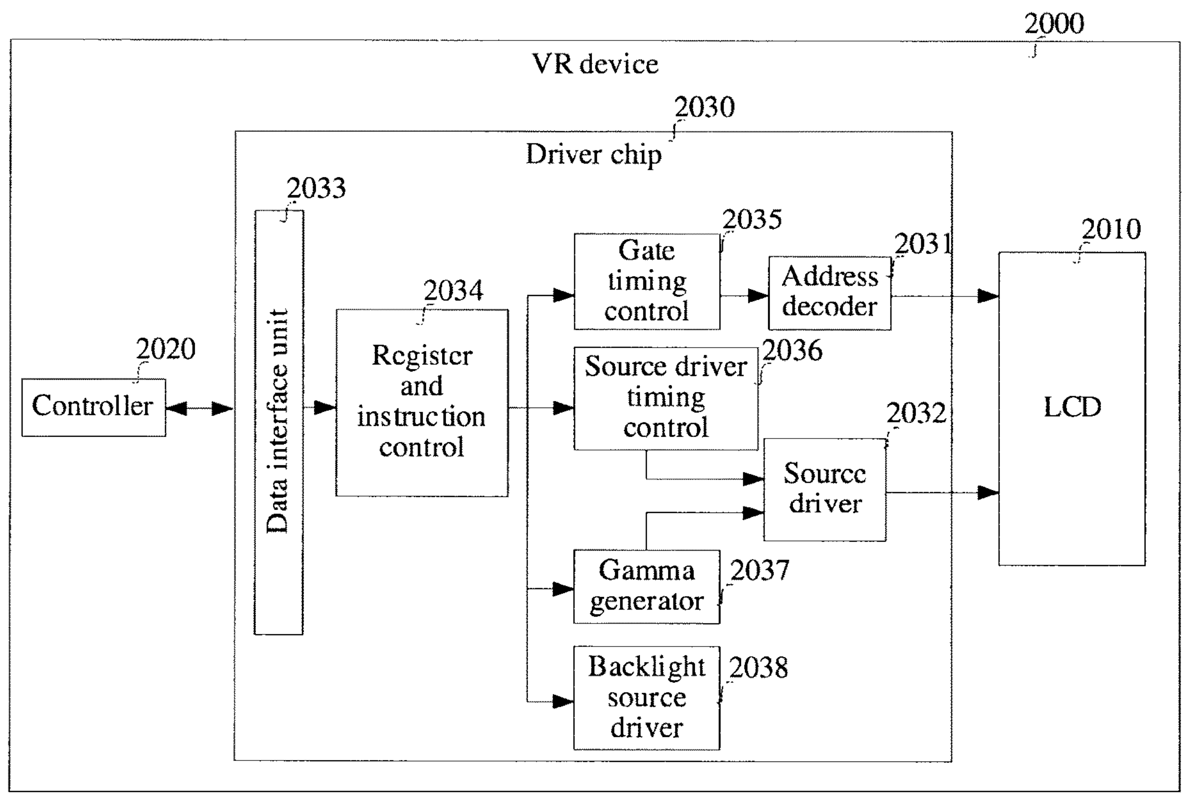
FIG. 20 is a schematic structural diagram of an electronic device according to an embodiment of the present disclosure.

FIG. 20 is a schematic structural diagram of an electronic device according to an embodiment of the present disclosure. As shown in FIG. 20, an example in which the electronic device is a VR device 2000 is used for description. In an embodiment, the device types of the VR device 2000 include: a VR helmet, VR glasses, and the like. The VR device 2000 includes one or more LCDs 2010 and one or more controllers 2020 of the LCDs. In an embodiment, any controller 2020 of the LCD may be a microcontroller integrated with the LCD liquid crystal panel.

In some embodiments, the VR device 2000 may further include a driver chip 2030 of the LCD, and the driver chip 2030 and the controller 2020 may form a drive circuit of the LCD; or the controller 2020 may alternatively be regarded as an integrated component of the driver chip 2030, so that the driver chip 2030 provides the drive circuit of the LCD alone.

The driver chip 2030 may include: an address decoder 2031 connected to the row electrodes of the LCD liquid crystal panel, and a source driver 2032 connected to the column electrodes of the LCD liquid crystal panel, where the address decoder 2031 and the source driver 2032 can respectively communicate with the controller 2020.

The controller 2020 is configured to load and perform the LCD driving method provided in the foregoing embodiments. That is, the controller 2020 determines drive voltages of pixel units in screen regions of the LCD based on an image frame to be displayed; outputs, for any screen region, a first drive signal to a pixel unit in the screen region based on the determined drive voltage corresponding to the pixel unit, the first drive signal being used for controlling a liquid crystal molecule corresponding to the pixel unit in the screen region to rotate at the drive voltage; and outputs a second drive signal to the backlight source of the LCD when a first drive signal for any screen region is outputted and a target duration is reached, the second drive signal being used for controlling a part of the backlight source corresponding to the screen region to be turned on.

The address decoder 2031 is configured to apply respective corresponding drive voltages to the row electrodes of the liquid crystal molecules according to the first drive signal outputted by the controller 2020, so as to gate the row addresses of the liquid crystal molecules. For example, the first drive signal may be a sequence formed by a series of drive voltages, and each drive voltage corresponds to a pixel unit of a row in the LCD liquid crystal panel.

The source driver 2032 is configured to drive the liquid crystal molecule to be rotated according to the first drive signal outputted by the controller 2020. In an embodiment, the same source voltage is set for each pixel unit in the same row, so that during gating of the row address of each liquid crystal molecule, it is only necessary to change the row electrode of each pixel unit in this row.

In some embodiments, the driver chip 2030 may further include: a data interface unit 2033, a register and instruction control 2034, a gate timing control 2035, a source driver timing control 2036, a backlight source driver 2037, a gamma generator 2038, and the like.

The data interface unit 2033 may be respectively connected to the controller 2020 and the register and instruction control 2034; the register and instruction control 2034 is connected to the gate timing control 2035, the source driver timing control 2036, the backlight source driver 2037, and the gamma generator 2038; the gate timing control 2035 is connected to the address decoder 2031; the source driver timing control 2036 and gamma generator 2038 are respectively connected to the source driver 2032; and the backlight source driver 2037 is connected to the backlight source.

In an embodiment, the data interface unit 2033 includes a system I/F and a data latch. The data interface unit 2033 is configured to receive and latch drive signals (such as a first drive signal and a second drive signal) sent by the controller 2020, and send the received drive signals to the register and instruction control 2034. In an embodiment, the system interface may be a mobile industry processor interface (MIPI).

The register and instruction control 2034 includes a register and an instruction controller. The register is configured to store the drive signals sent by the data interface unit 2033, and the instruction controller is configured to control the sending of the drive signals. The instruction controller may send the first drive signal to the gate timing control 2035, the source driver timing control 2036, and the gamma generator 2038, and may also send the second drive signal to the backlight source driver 2037.

The gate timing control 2035 generates a row start signal, a row clock pulse signal, a row voltage signal sequence, and the like according to the first drive signal, and sends the generated signals to corresponding input ports of the address decoder 2031. The address decoder 2031 receives the row start signal, the row clock pulse signal, and the row voltage signal sequence of the gate timing control 2035, and under the action of the row clock pulse signal, translates the row voltage signal sequence into a gate voltage signal (that is, drive voltage), and applies the gate voltage signal to the corresponding row electrode to gate the corresponding row address.

The source driver timing control 2036 generates a column start signal, a column clock pulse signal, a column control signal, and the like according to the first drive signal, and sends the generated signals to the source driver 2032. The gamma generator 2038 generates a gray scale voltage according to the first drive signal through an internal resistor divider network, and sends the gray scale voltage to the source driver 2032.

The source driver 2032 converts, by using the gray scale voltage as a reference, the column control signal into a voltage signal used for being applied to the column electrode according to the received column start signal, column clock pulse signal, column control signal, and gray scale voltage, and under the action of the column clock pulse signal, applies the voltage signal to the column electrode to drive the liquid crystal molecule to be rotated.

The light source driver 2037 is configured to control, according to the second drive signal outputted by the controller 2020, some of light sources corresponding to each screen region in the LCD to be turned on. For example, the backlight source driver 2037 performs analog-to-digital conversion and power amplification on the received second drive signal, then sends it to the Mini LED backlight source, then controls some of light sources in the Mini LED backlight source corresponding to the screen region that needs to be lit currently to be turned on, and control the part of the backlight source corresponding to the screen region to be turned off after a continuous lighting duration.

A person skilled in the art can understand that the structure shown in FIG. 20 does not constitute a limitation to the VR device 2000, and the VR device may include more or fewer components than those shown in the figure, or some components may be combined, or a different component arrangement may be used.

Figure 21:
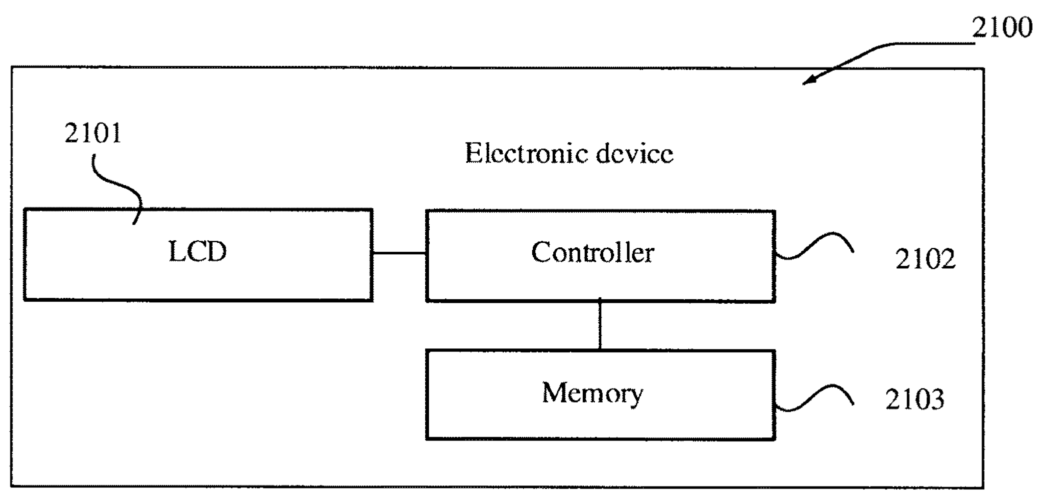
FIG. 21 is another schematic structural diagram of an electronic device according to an embodiment of the present disclosure.

FIG. 21 is a schematic structural diagram of an electronic device according to an embodiment of the present disclosure. The electronic device 2100 may vary a lot due to different configurations or performance. The electronic device 2100 includes one or more LCDs 2101, one or more controllers 2102 and one or more memories 2103 of the LCD, the memory 2103 storing at least one computer program, the at least one computer program being loaded and executed by the one or more controllers 2102 to implement the LCD driving method provided in the foregoing embodiments. In an embodiment, the electronic device 2100 further includes components such as a wired or wireless network interface, a keyboard, and an input/output (I/O) interface, to facilitate input and output. The electronic device 2100 further includes another component configured to implement a function of a device. Details are not further described herein. In an embodiment, the electronic device 2100 may be a VR device. In this case, the LCD is a display component of the VR device. Certainly, the electronic device 2100 may alternatively be a non-VR device. This is not specifically limited in the embodiments of the present disclosure.

In an exemplary embodiment, a driver chip of an LCD is further provided. The driver chip includes one or more controllers and one or more memories, the one or more memories storing at least one computer program, the at least one computer program being loaded and executed by the one or more controllers to implement the LCD driving method provided in the foregoing embodiments.

In an exemplary embodiment, a computer-readable storage medium, for example, a memory including at least one computer program is further provided. The at least one computer program may be executed by a controller of an LCD in an electronic device to implement the LCD driving method in the foregoing embodiments. For example, the computer-readable storage medium includes a read-only memory (ROM), a random-access memory (RAM), a compact disc read-only memory (CD-ROM), a magnetic tape, a floppy disk, an optical data storage device, or the like.

In an exemplary embodiment, a computer program product or a computer program is further provided, including one or more pieces of program code, the one or more pieces of program code being stored in a computer-readable storage medium. One or more controllers of an LCD in an electronic device can read the one or more pieces of program code from the computer-readable storage medium, and the one or more controllers execute the one or more pieces of program code to enable the electronic device to perform the LCD driving method in the foregoing embodiments.

A person of ordinary skill in the art may understand that all or some of the steps of the foregoing embodiments may be implemented by hardware, or may be implemented a program instructing related hardware. In an embodiment, the program is stored in a computer-readable storage medium. In an embodiment, the storage medium is a ROM, a magnetic disk, or an optical disc.

The foregoing descriptions are merely embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A liquid crystal display (LCD) driving method, performed by a controller of an LCD, the method comprising:
 determining drive voltages of pixel units in a plurality of screen regions of the LCD based on an image frame to be displayed;
 determining priorities for the plurality of screen regions of the LCD, comprising:
  determining, for one of the screen regions, pixel values of pixel points corresponding to pixel units in the screen region in the image frame;
  determining target pixel values of pixel points corresponding to the pixel units in the screen region in a previous frame of the image frame;
  acquiring pixel change values between the pixel values and the target pixel values of the pixel points; and
  determining a priority of the screen region based on an average value of the pixel change values of the pixel points, the priority of the screen region being positively correlated with the average value of the pixel change values;
 outputting, for one of the plurality of screen regions, a first drive signal to a pixel unit in the screen region based on the determined drive voltage corresponding to the pixel unit, the first drive signal being used for controlling a liquid crystal molecule corresponding to the pixel unit in the screen region to rotate at the drive voltage; and
 outputting a second drive signal to a backlight source of the LCD when the first drive signal is output to the pixel unit in the screen region and a target duration is reached, the second drive signal being used for controlling a part of the backlight source corresponding to the screen region to be turned on.

2. The method according to claim 1, wherein the outputting, for one of the plurality of screen regions, a first drive signal to a pixel unit in the screen region based on the determined drive voltage corresponding to the pixel unit comprises:
 performing, in descending order of the priorities, the operation of outputting a first drive signal to a pixel unit in the screen region based on the determined drive voltage corresponding to the pixel unit.

3. The method according to claim 1, wherein the determining drive voltages of pixel units in a plurality of screen regions of the LCD based on an image frame to be displayed comprises:
 determining, for one of the screen regions, pixel values of pixel points corresponding to pixel units in the screen region in the image frame;
 determining, for one of the pixel units in the screen region, a target rotation angle of a liquid crystal molecule corresponding to the pixel unit based on the pixel value of the pixel point corresponding to the pixel unit; and
 determining the drive voltage that needs to be applied to rotate the liquid crystal molecule to the target rotation angle.

4. The method according to claim 1, wherein the outputting a second drive signal to a backlight source of the LCD comprises:
 determining a loop corresponding to the screen region in a backlight circuit of the backlight source; and
 controlling, through the second drive signal, the loop to be turned on, to turn on the part of the backlight source corresponding to the screen region.

5. The method according to claim 1, further comprising:
 receiving a next image frame of the image frame; and
 determining next drive voltages of the pixel units in the plurality of screen regions of the LCD, sequentially inputting next first drive signals to the pixel units in the plurality of screen regions of the LCD based on the determined next drive voltage corresponding to the pixel units, and outputting, for the one of the plurality of screen regions, a next second drive signal to the backlight source of the LCD when the next first drive signal is output to the pixel unit in the screen region and the target duration is reached.

6. The method according to claim 1, wherein the LCD is a display component of a virtual reality (VR) device, and the image frame is a VR image frame.

7. A drive chip of a liquid crystal display (LCD), the LCD further comprising: a display module comprising liquid crystal molecules, and a mini light emitting diode (Mini LED) backlight module comprising red green blue (RGB) Mini LEDs configured to provide a backlight source to the display module, wherein the driver chip is configured to:
 determine drive voltages of pixel units in a plurality of screen regions of the LCD based on an image frame to be displayed;
 determine priorities for the plurality of screen regions of the LCD, comprising:
  determining, for one of the screen regions, pixel values of pixel points corresponding to pixel units in the screen region in the image frame;
  determining target pixel values of pixel points corresponding to the pixel units in the screen region in a previous frame of the image frame;
  acquiring pixel change values between the pixel values and the target pixel values of the pixel points; and
  determining a priority of the screen region based on an average value of the pixel change values of the pixel points, the priority of the screen region being positively correlated with the average value of the pixel change values;
 output, for one of the plurality of screen regions, a first drive signal to a pixel unit in the screen region based on the determined drive voltage corresponding to the pixel unit, the first drive signal being used for controlling a liquid crystal molecule corresponding to the pixel unit in the screen region to rotate at the drive voltage; and
 output a second drive signal to the Mini LED backlight module when the first drive signal is output to the pixel unit in the screen region and a target duration is reached, the second drive signal being used for controlling a part of the backlight source corresponding to the screen region to be turned on.

8. The drive chip according to claim 7, wherein the driver chip is further configured to:

perform, in descending order of the priorities, the operation of outputting a first drive signal to a pixel unit in the screen region based on the determined drive voltage corresponding to the pixel unit.

9. The driver chip according to claim 7, wherein the driver chip is further configured to:

determine, for one of the screen regions, pixel values of pixel points corresponding to pixel units in the screen region in the image frame;

determine, for one of the pixel units in the screen region, a target rotation angle of a liquid crystal molecule corresponding to the pixel unit based on the pixel value of the pixel point corresponding to the pixel unit; and determine the drive voltage that needs to be applied to rotate the liquid crystal molecule to the target rotation angle.

10. The driver chip according to claim 7, wherein the driver chip is further configured to:

determine a loop corresponding to the screen region in a backlight circuit of the backlight source; and control, through the second drive signal, the loop to be turned on, to turn on the part of the backlight source corresponding to the screen region.

11. The driver chip according to claim 7, wherein the driver chip is further configured to:

receive a next image frame of the image frame; and determine next drive voltages of the pixel units in the plurality of screen regions of the LCD, sequentially inputting next first drive signals to the pixel units in the plurality of screen regions of the LCD based on the determined next drive voltage corresponding to the pixel units, and outputting, for the one of the plurality of screen regions, a next second drive signal to the backlight source of the LCD when the next first drive signal is output to the pixel unit in the screen region and the target duration is reached.

12. The driver chip according to claim 7, wherein the LCD is a display component of a virtual reality (VR) device, and the image frame is a VR image frame.

13. A non-transitory computer-readable storage medium, storing at least one computer program, the at least one computer program being loaded and executed by a controller of a liquid crystal display (LCD) to implement:

determining drive voltages of pixel units in a plurality of screen regions of the LCD based on an image frame to be displayed;

determining priorities for the plurality of screen regions of the LCD, comprising:

determining, for one of the screen regions, pixel values of pixel points corresponding to pixel units in the screen region in the image frame;

determining target pixel values of pixel points corresponding to the pixel units in the screen region in a previous frame of the image frame;

acquiring pixel change values between the pixel values and the target pixel values of the pixel points; and determining a priority of the screen region based on an average value of the pixel change values of the pixel points, the priority of the screen region being positively correlated with the average value of the pixel change values;

outputting, for one of the plurality of screen regions, a first drive signal to a pixel unit in the screen region based on the determined drive voltage corresponding to the pixel unit, the first drive signal being used for controlling a liquid crystal molecule corresponding to the pixel unit in the screen region to rotate at the drive voltage; and outputting a second drive signal to a backlight source of the LCD when the first drive signal is output to the pixel unit in the screen region and a target duration is reached, the second drive signal being used for controlling a part of the backlight source corresponding to the screen region to be turned on.

14. The storage medium according to claim 13, wherein the outputting, for one of the plurality of screen regions, a first drive signal to a pixel unit in the screen region based on the determined drive voltage corresponding to the pixel unit comprises:

performing, in descending order of the priorities, the operation of outputting a first drive signal to a pixel unit in the screen region based on the determined drive voltage corresponding to the pixel unit.

* * * * *